(12) United States Patent
Iwayama et al.

(10) Patent No.: US 9,036,217 B2
(45) Date of Patent: May 19, 2015

(54) IMAGE PROCESSING SYSTEM, APPARATUS, METHOD AND COMPUTER READABLE MEDIUM FOR CROPPING A DOCUMENT WITH TABS AMONG SIDES

(75) Inventors: Akira Iwayama, Kahoku (JP); Masayoshi Hayashi, Kahoku (JP)

(73) Assignee: PFU Limited, Kahoku-shi (JP)

( * ) Notice: Subject to any disclaimer, the term of this patent is extended or adjusted under 35 U.S.C. 154(b) by 163 days.

(21) Appl. No.: 13/543,645

(22) Filed: Jul. 6, 2012

(65) Prior Publication Data

US 2013/0050772 A1     Feb. 28, 2013

(30) Foreign Application Priority Data

Aug. 29, 2011   (JP) ................................. 2011-185692

(51) Int. Cl.
*H04N 1/40* (2006.01)
*G06K 9/32* (2006.01)

(52) U.S. Cl.
CPC ................ *H04N 1/40* (2013.01); *G06K 9/3275* (2013.01)

(58) Field of Classification Search
None
See application file for complete search history.

(56) References Cited

U.S. PATENT DOCUMENTS

| 5,668,898 | A * | 9/1997 | Tatsuta ........................... 382/290 |
| 7,145,680 | B2 * | 12/2006 | Wu et al. ....................... 358/1.15 |
| 8,009,335 | B2 * | 8/2011 | Honda ........................... 358/488 |
| 2005/0158093 | A1 * | 7/2005 | Kato et al. ..................... 399/388 |
| 2007/0269109 | A1 * | 11/2007 | Ziv-El ............................ 382/173 |
| 2009/0231639 | A1 | 9/2009 | Iwayama | |
| 2011/0205563 | A1 | 8/2011 | Stewart | |

FOREIGN PATENT DOCUMENTS

| JP | 02-228779 | 9/1990 |
| JP | 2006-237677 | 9/2006 |
| JP | 2009-218953 | 9/2009 |
| JP | 2010-211643 | 9/2010 |
| JP | 2011-071587 | 4/2011 |

OTHER PUBLICATIONS

Office action mailed Jul. 15, 2014 in corresponding Japanese Patent Application No. 2011-185692, including English translation, 8pp.
Office action mailed Aug. 26, 2014 for corresponding Chinese Application No. 201210310572.0, including English translation 14 pp.

* cited by examiner

*Primary Examiner* — Steven Kau
(74) *Attorney, Agent, or Firm* — Christie, Parker & Hale, LLP

(57) ABSTRACT

Provided are an image processing apparatus, an image processing method, a computer-readable medium storing a computer program and an image processing system cropping a document image from image data including a document region having a tab. The image processing apparatus includes a line determination unit for determining a line extending the boundary of the document region in the tab portion and a line extending the boundary of the document region in the non-tab portion, respectively, a selector for selecting, in accordance with the setting designating the outside or the inside of the document region, one line either in the outside or in the inside from the among lines determined by the line determination unit, and an image cropper for cropping an image of the document region with the selected line as a boundary line.

6 Claims, 24 Drawing Sheets

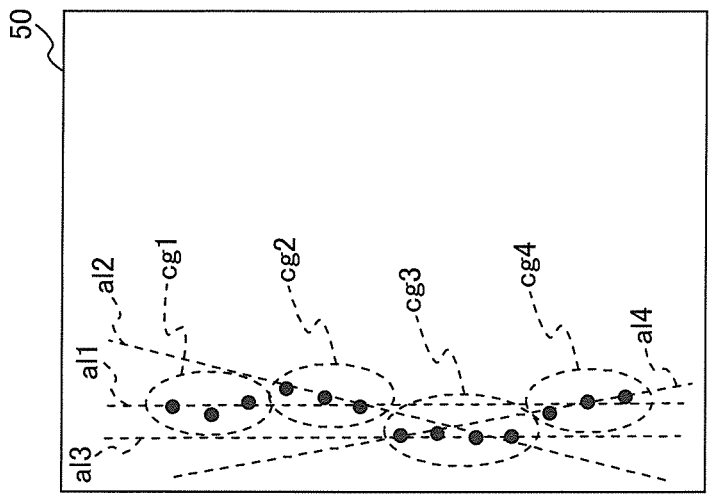
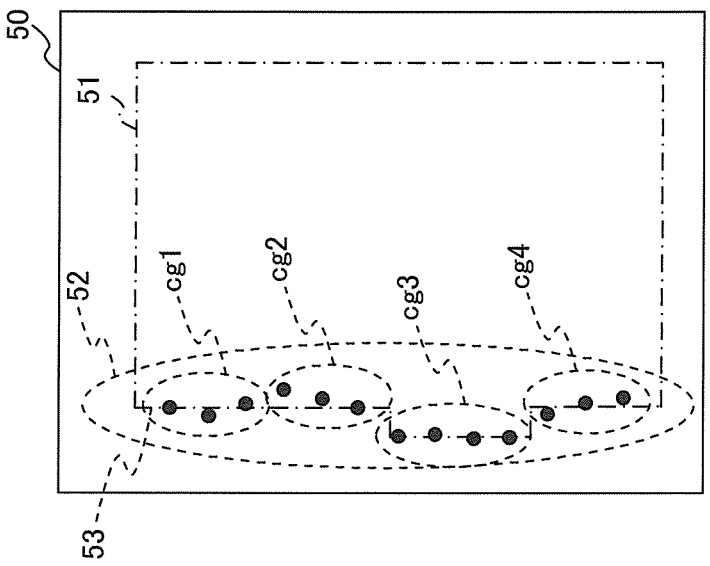
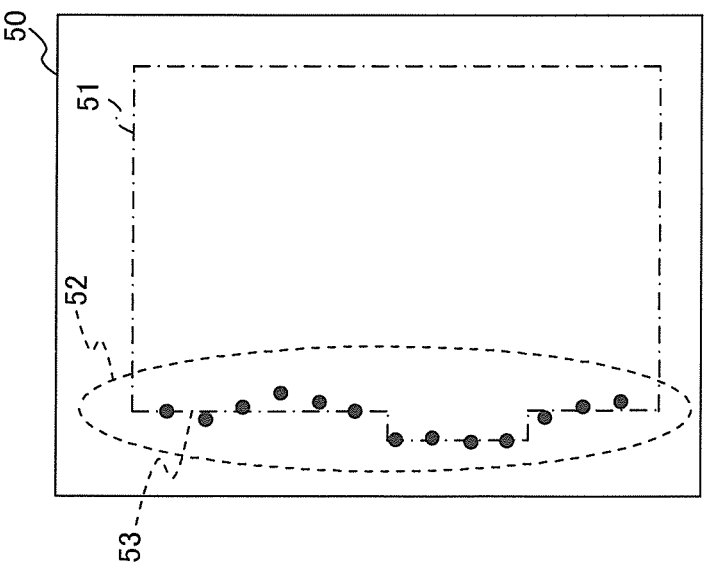

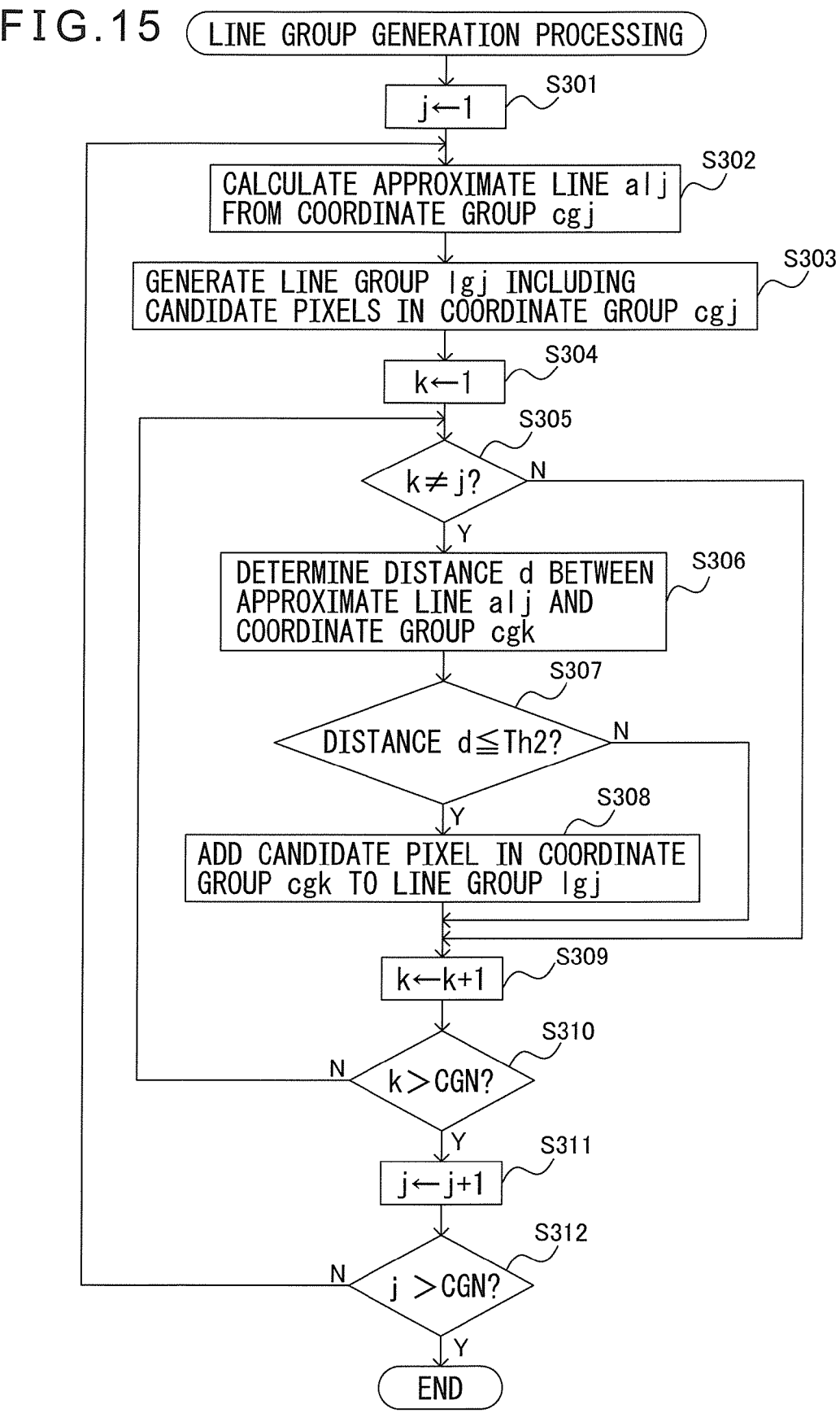

of priority of prior Japanese Patent Application No. 2011-185692, filed on Aug. 29, 2011, the entire contents of which are incorporated herein by reference.
IMAGE PROCESSING SYSTEM, APPARATUS, METHOD AND COMPUTER READABLE MEDIUM FOR CROPPING A DOCUMENT WITH TABS AMONG SIDES

CROSS-REFERENCE TO RELATED APPLICATIONS

This application is based upon and claims the benefit of priority of prior Japanese Patent Application No. 2011-185692, filed on Aug. 29, 2011, the entire contents of which are incorporated herein by reference.

TECHNICAL FIELD

Embodiments described in the present specification relate to image processing.

BACKGROUND

An image processing apparatus has been known which acquires image data by reading a document and detects a document region from the image data. For example, the image processing apparatus acquires an image containing a document region, detects coordinate values of edge candidate pixels based on the obtained image, calculates the tilting of the document region based on the detected coordinate values of the edge candidate pixels, and extracts coordinate values of edge end candidate pixels based on the detected coordinate values of the edge candidate pixels. Then, the image processing apparatus calculates a straight line corresponding to an edge based on the calculated tilting of the document region and the extracted coordinate values of edge end candidate pixels, and corrects the tilting of the document region on the basis of the calculated straight line corresponding to the edge, and crops the document region from the image based on the relevant straight line.

Related art is disclosed in Japanese Laid-open Patent Publication No. 2009-218953.

SUMMARY

Image data processed by the image processing device may include data obtained by reading a document having a tab. FIG. 1 is a schematic view depicting a document having a tab. Reference numeral 101 denotes main body of the document 100, and reference numeral 102 denotes a tab portion of the document 100. The tab 102 is the portion on one side 103 forming an edge of the document 100 where, when the boundary line between the document 100 and its external region include an outer boundary line 105 and an inner boundary line 104, a side is formed by the outer boundary line 105.

As a document having a tab, a catalog, a manual, or a pamphlet, for example, may be mentioned. The tab 102 may contain certain information such as a heading. The tab 102 may be distinguished with a color. Image in the portion of the tab 102 may be, or may not be required, depending on the type and use of the document and on the relevant purpose of the read-out document image.

It is an object of the apparatus and the method disclosed in the present specification to detect a boundary line for cropping a document image including a tab or a boundary line for cropping a document image with a tab eliminated, from image data including a document region having a tab.

In accordance with an aspect of the embodiment, an image processing apparatus is provided. The image processing apparatus includes an image input unit for taking image data including a document region as input, a line determination unit for determining, for a side having a tab among sides of the document region, a line extending the boundary of the document region in the tab portion and a line extending the boundary of the document region in the non-tab portion, respectively, a selector for selecting, in accordance with the setting designating the outside or the inside of the document region, one line either in the outside or in the inside from the among lines determined by the line determination unit, and an image cropper for cropping an image of the document region with the selected line as a boundary line.

In accordance with another aspect of the embodiment, an image processing system having an image reading device and a computer that receives an image read by the image reading device via communication with the image reading device is provided. The image processing system includes a line determination unit for determining, for a side having a tab among sides of the document region included in the image data read by the image reading device, a line extending the boundary of the document region in the tab portion and a line extending the boundary of the document region in the non-tab portion, respectively, a selector for selecting, in accordance with the setting that designates the outside or the inside of the document region, one line either in the outside or in the inside from the lines determined by the line determination unit, and an image cropper for cropping an image of the document region with the selected line as the boundary line.

In accordance with another aspect of the embodiment, an image processing method is provided. The image processing method includes acquiring image data including a document region, determining, using a computer, for a side having a tab among sides of the document region, a line extending the boundary of the document region in the tab portion and a line extending the boundary of the document region in the non-tab portion, respectively, selecting one line either in the outside or in the inside of the document region from among the determined lines, in accordance with the setting that designates the outside or the inside, and cropping an image of the document region with the selected line as the boundary line.

In accordance with another aspect of the embodiment, there is provided a computer-readable, non-transitory medium for image processing. The computer program causes a computer to execute a process, the process comprising acquiring image data including a document region, determining, for a side having a tab among sides of the document region, a line extending the boundary of the document region in the tab portion and a line extending the boundary of the document region in the non-tab portion, respectively, selecting one line either in the outside or in the inside of the document region from among the determined lines, in accordance with the setting that designates the outside or the inside, and cropping an image of the document region with the selected line as the boundary line.

In accordance with the apparatus and the method disclosed in the present specification, it is possible to detect a boundary line for cropping a document image including a tab or a boundary line for cropping a document image with a tab eliminated, from image data including a document region having a tab.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

FIG. 4A is a diagram illustrating the processing depicted in FIG. 3.

FIG. 4B is a diagram illustrating the processing depicted in FIG. 3.

FIG. 4C is a diagram illustrating the processing depicted in FIG. 3.

FIG. 15 is a diagram illustrating the line group generation processing performed by the line determination unit.

DESCRIPTION OF EMBODIMENTS

1. Hardware Construction

Figure 1:
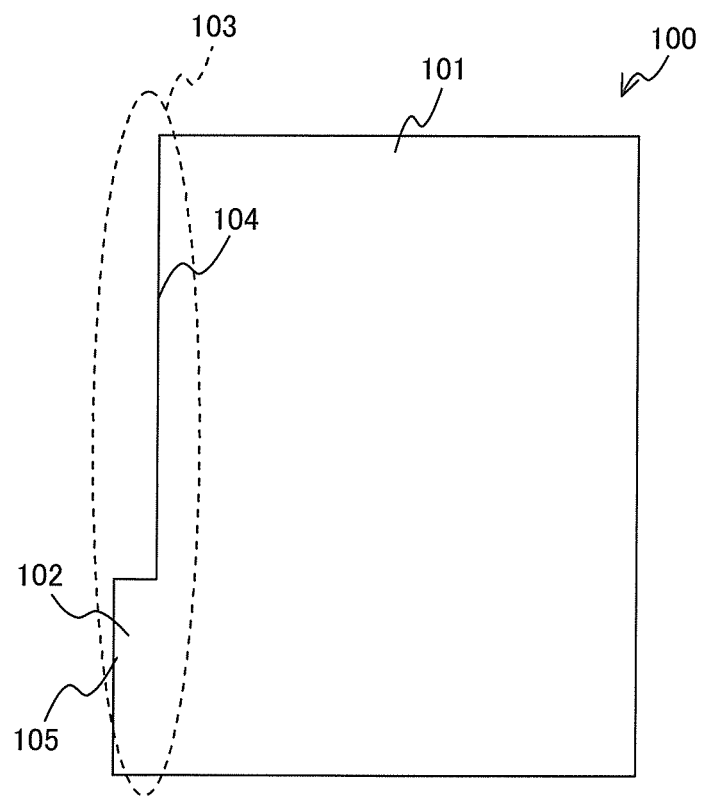
FIG. 1 is a schematic diagram illustrating a document having a tab.
Figure 2:
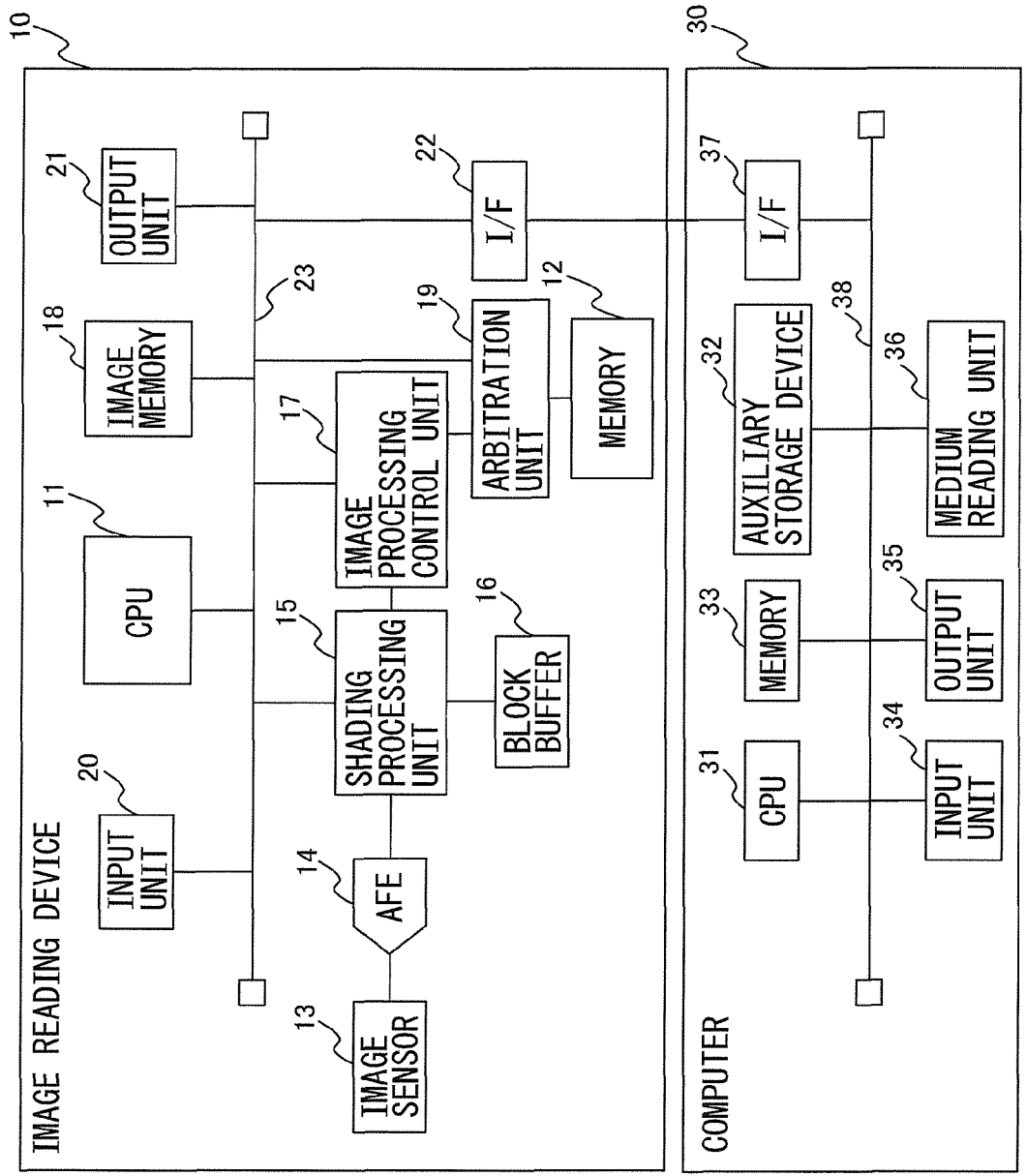
FIG. 2 is a diagram illustrating the hardware construction of an image processing system.

The embodiments will be described with reference to appended drawings that illustrate embodiments thereof. FIG. 2 is a diagram illustrating the hardware construction of an image processing system. The image processing system 1 includes an image reading device 10 and a computer 30. The image reading device 10 reads a two-dimensional document and generates an image signal corresponding to the document. The image reading device 10 may be, for example, an image reader that reads by scanning a two-dimensional document irradiated with plural light sources. Examples of such image reader include, for example, various scanners including a feeder scanner, a flat bed scanner, a handy scanner, and the like.

The computer 30 can communicate with the image reading device 10 via a wired or wireless communication line, and receives image signal of the document read by the image reading device 10 via the communication line from the image reading device 10.

The image reading device 10 includes a CPU (Central Processing Unit) 11, a memory 12, an image sensor 13, an AFE (Analog Front-End Processor) 14, a shading processing unit 15, and a block buffer 16. The image reading device 10 also includes an image processing control unit 17, an image memory 18, an arbitration unit 19, an input unit 20, an output unit 21, an interface (I/F) 22 and a bus 23.

CPU 11 controls the operation of the image reading device 10 in accordance with the computer program stored in the memory 12. CPU 11 may perform image processing of the document image read by the image reading device 10. The memory 12 may also store a computer program for such image processing. The memory 12 stores computer program executed by CPU 11, and data used in the execution of the computer program. The memory 12 may include a non-volatile storage device for storing the program and a volatile memory for temporarily storing data.

The image sensor 13 captures an image of two-dimensional document, and outputs image signal corresponding to the document. The image sensor 13 includes imaging device such as CCD (Charge Coupled Device) sensor, CMOS (Complementary Metal Oxide Semiconductor) sensor, etc., arranged in one-dimensional or two-dimensional array, and an optical system forming an image of the document on the imaging device. AFE 14 performs signal processing on the image signal outputted from the image sensor 13, and then inputs the processed signal to the shading processing unit 15.

The shading processing unit 15 stores the image signal received from AFE 14 as image data in the block buffer 16, performs shading processing on the image data, and then outputs the processed image data to the image processing control unit 17. The image processing control unit 17 performs prescribed image processing on the image data after shading processing, and stores the image data in the image memory 18. In another embodiment, the shading processing unit 15 may store the image data after shading processing in the image memory 18, and the image processing control unit 17 may take the image data from the image memory 18. The arbitration unit 19 arbitrates access to the memory 12 by the image processing control unit 17 in image processing and access to the memory 12 by CPU 11 so as not to compete with each other.

In an embodiment, the shading processing unit 15, the image processing control unit 17, and the arbitration unit 19 may be mounted to the image reading device 10 as a logic circuit. Logic circuit may be, for example, LSI (Large Scale Integration), ASIC (Application Specific Integrated Circuit), FPGA (Field Programming Gate Array), or the like. In another embodiment, the shading processing unit 15, the image processing control unit 17, and the arbitration unit 19 may be mounted to the image reading device 10 as an electronic circuit including a processor such as CPU, DSP (Digital Signal Processor), or the like, and a memory storing the program to be executed by the processor.

The input unit 20 is an inputting device that receives input operation from a user. The input unit 20 may be, for example, a button, a scroll wheel, a key pad, a keyboard, a pointing device, a touch panel, or the like. The output unit 21 is an outputting device for presenting a variety of information from the image reading device 10 to a user. The output unit 21 may be, for example, a display device for visually displaying information to be presented to a user. The output unit 21 may be a display device such as a light emitting device, a liquid crystal display, an organic electro-luminescence display, or the like. Or, the output unit 21 may be a speaker and its drive circuit for outputting audio signal.

I/F 22 is a wired or wireless communication interface between the image reading device 10 and the computer 30. The image reading device 10 can transmit the image data of the document read via I/F 22 to the computer 30. The image reading device 10 receives setting information and instruction on the operation of the image reading device 10 from the computer 30 via I/F 22. In an embodiment, the image reading device 10 may receive image data subjected to processing by the computer 30 via I/F 22. CPU 11, the shading processing unit 15, the image processing control unit 17, the arbitration unit 19, the input unit 20, the output unit 21 and I/F 22 are electrically connected by the bus 23.

On the other hand, the computer 30 includes CPU 31, an auxiliary storage device 32, a memory 33, an input unit 34, an output unit 35, a medium reading unit 36, I/F 37 and the bus 38. CPU 31 carries out information processing in accordance with a computer program stored in the auxiliary storage device 32 by executing this computer program. In an embodiment, CPU 31 may perform image processing of the document image read by the image reading device 10. A computer program for such image processing may be stored in the auxiliary storage device 32. The auxiliary storage device 32 may include a non-volatile memory, a ROM (Read Only Memory), a hard disc, and the like.

The memory 33 stores the program being executed by CPU 31, and data used temporarily by this program. The memory 33 may include RAM (Random Access Memory). The input unit 34 is an input device that receives inputting operation by a user. The input unit 34 may be, for example, a key pad, a keyboard, a pointing device, a touch panel, or the like.

The output unit 35 is an outputting device that outputs signal processed by the computer 30. For example, the output unit 35 may be a display device for displaying information processed by the computer 30 visually to a user. The output unit 35 may be a display device, for example, a liquid crystal display, CRT (Cathode Ray Tube) display, an organic electro-luminescence display, or the like. Alternatively, the output unit 35 may be a speaker and its drive circuit outputting audio signal.

The medium reading unit 36 is an inputting device for reading data stored in a computer-readable portable recording medium. The medium reading unit 36 may be, for example, an access device to a CD ROM (Compact Disk Read Only Memory) drive, a DVD ROM (Digital Versatile Disk Read Only Memory) drive, a flexible disc drive, a CD-R (Compact Disc Recordable) drive or a DVD-R (Digital Versatile Disk Recordable) drive, a MO (Magneto-Optical disk) drive, a flash memory drive, and the like.

I/F 37 is a wired or wireless communication interface between the image reading device 10 and the computer 30. The computer 30 can receive the image data of document read by the image reading device 10 via I/F 37. The computer 30 transmits setting information and instructions on the operation of the image reading device 10 via I/F 37 to the image reading device 10. CPU 31, the auxiliary storage device 32, the memory 33, the input unit 34, the output unit 35, the medium reading device 36, and I/F 37 are electrically connected via the bus 38.

2. First Example 2.1. Overview

Figure 3:
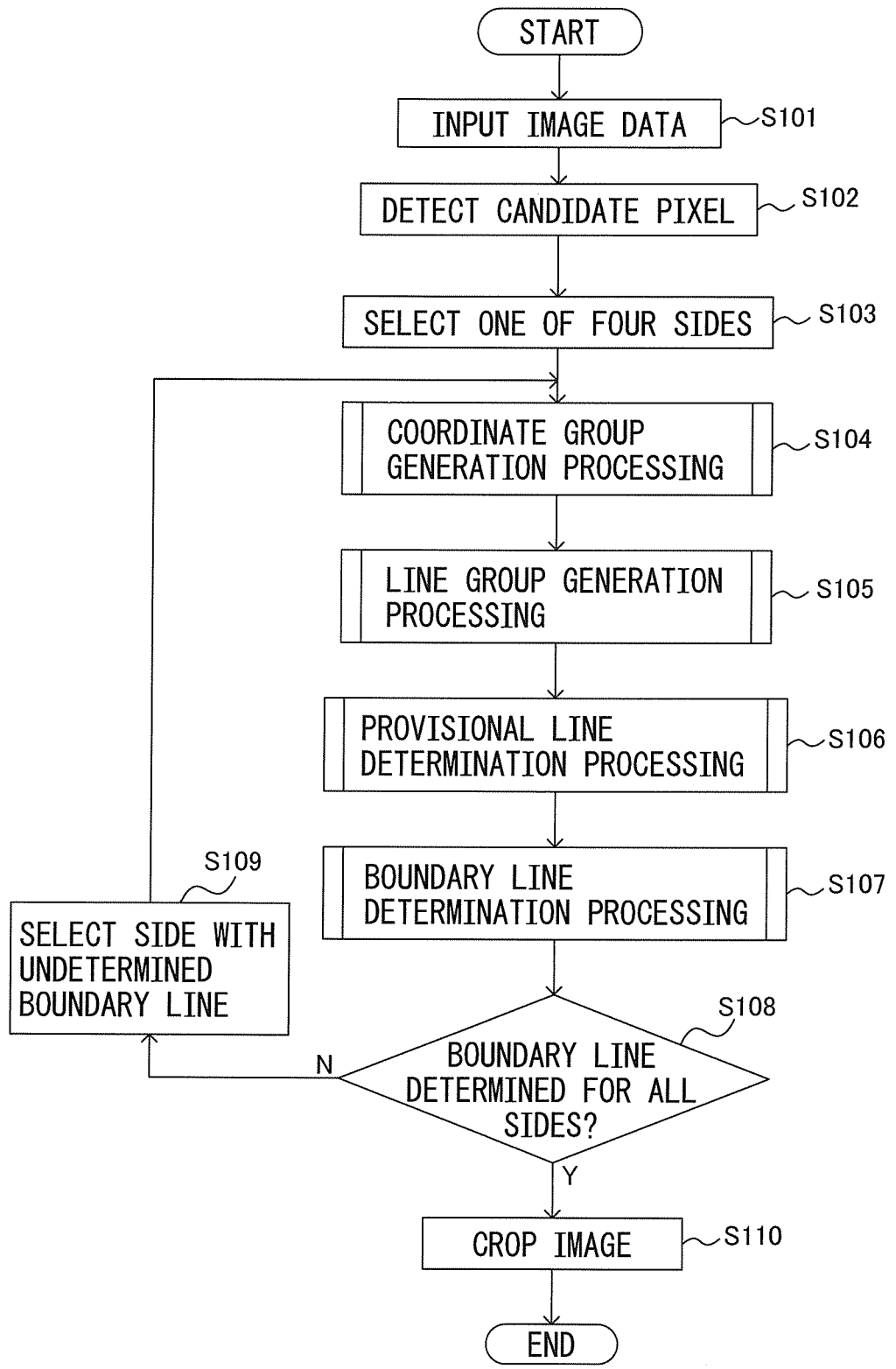
FIG. 3 is a diagram illustrating a first example of the processing performed by the image processing system.

Next, referring to FIG. 3, the first example of processing performed by the image processing system 1 will be described. At step S101, the image processing system 1 takes image data as input. FIG. 4A illustrates image data inputted. The image data 50 include a document region 51 corresponding to a document read by the image reading device 10. At step S102, the image processing system 1 detects candidate pixels on respective sides of the document region which constitute candidate pixels for constructing boundary lines between the document region and its exterior on respective sides. In FIGS. 4A to 4C, FIGS. 5A to 5C, and FIG. 6, the candidate pixels detected on the boundary line 53 on the side 52 are depicted in black dots as examples.

At step S103, the image processing system 1 selects one of the sides of the document region. Following steps S104 to S107 are executed for each of the sides of the document region.

At step S104, the image processing system 1 generates a plurality of coordinate groups by classifying the detected candidate pixels detected on a plurality of portions on the boundary line 53 into different groups. FIG. 4B illustrates candidate pixels classified in coordinate groups cg1 to cg4.

At step S105, the image processing system 1 determines a line group formed by a set of candidate pixels belonging to a plurality of coordinate groups. At this time, the image processing system 1 calculates respective approximate lines of the boundary line 53 based on the candidate pixels belonging to respective coordinate groups cg1 to cg4. Various calculation methods such as least square method, Hough transformation, etc., may be utilized for calculating an approximate line from coordinates of the candidate pixels. In FIG. 4C, approximate lines al1 to al4 are approximate lines respectively calculated based on the candidate pixels belonging to coordinate groups cg1 to cg4.

Figure 5C:
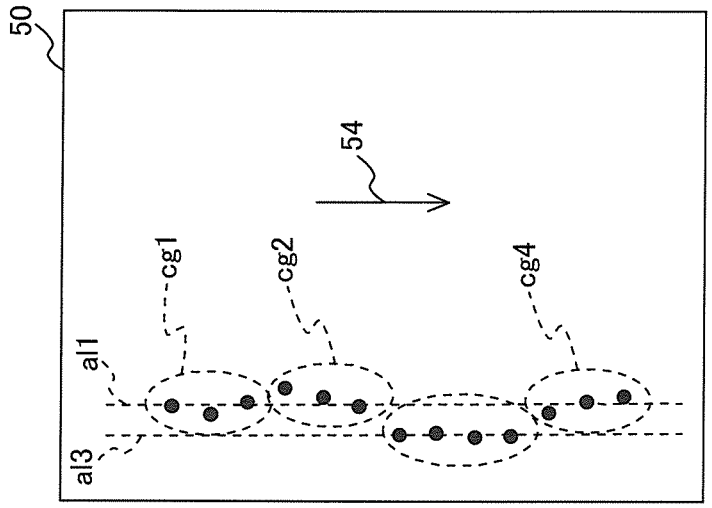
FIG. 5C is a diagram illustrating the processing depicted in FIG. 3.
Figure 5B:
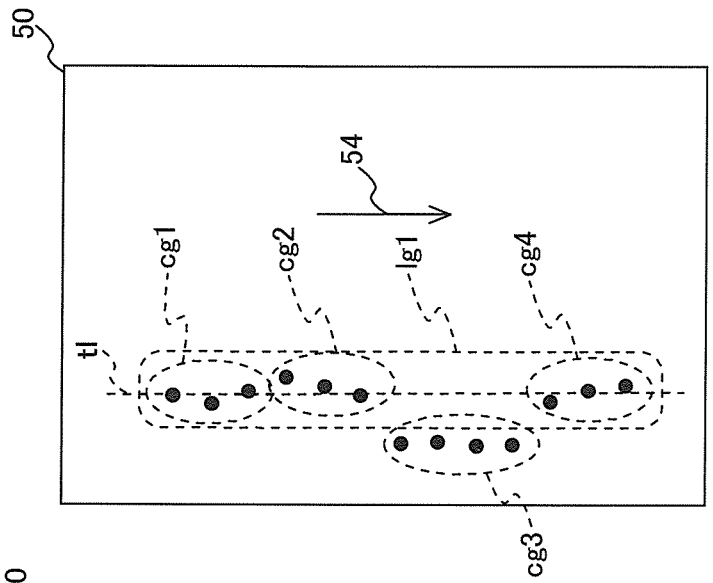
FIG. 5B is a diagram illustrating the processing depicted in FIG. 3.
Figure 5A:
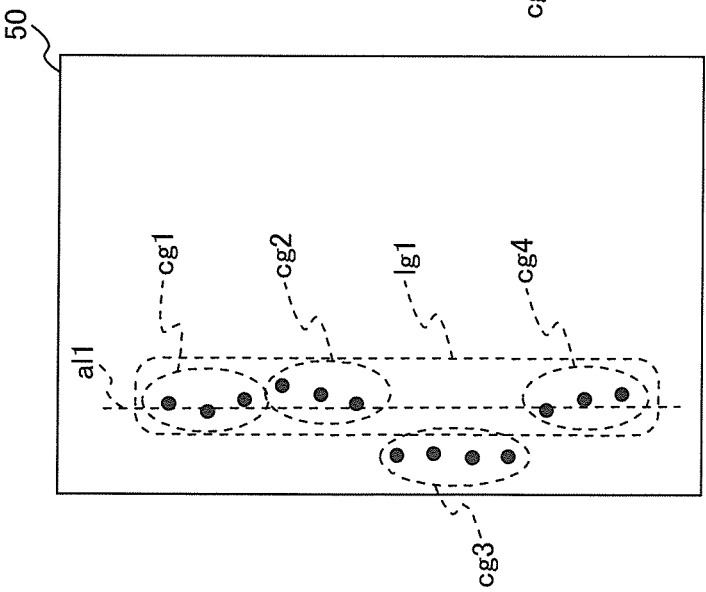
FIG. 5A is a diagram illustrating the processing depicted in FIG. 3.

Next, with respect to each of the approximate lines al1 to al4, the image processing system 1 forms a set of candidate pixels within a prescribed distance from each approximate line, and determines each set as a line group. FIG. 5A is a diagram illustrating a line group lg1 formed by a set of candidate pixels within the prescribed distance from the approximate line al1. The line group lg1 includes candidate pixels belonging to the coordinate groups cg1, cg2, and cg4. These candidate pixels belonging to the coordinate groups cg1, cg2, and cg4 are within the prescribed distance from the approximate line al1. Line groups may be determined in the same manner with respect other approximate lines al2 to al4.

At step S106, the image processing system 1 determines a provisional line for the boundary line 53. The image processing system 1 selects, from among the line groups generated at step S105, the line group to which the largest number of candidate pixels belong. In the present example, the line group lg1 depicted in FIG. 5A is selected as the line group to which the largest number of candidate pixels belong.

The image processing system 1 determines a provisional line for the boundary line 53 based on the candidate pixels included in the selected line group. In order to determine a provisional line from the coordinates of the candidate pixels, various calculation method such as the least square method or Hough transformation can be utilized. In the example depicted in FIG. 5B, the image processing system 1 determines a provisional line t1 for the boundary line 53 based on the candidate pixels belonging to the coordinate groups cg1, cg2 and cg4. Direction of inclination of the provisional line is denoted by reference numeral 54.

At step S107, the image processing system 1 determines the boundary line for cropping the document region from image data. The image processing system 1 selects any of the approximate lines al1 to al4 depicted in FIG. 4C based on the provisional line. The image processing system 1 may select any of the approximate lines al1 to al4 based, for example, on the slope 54 of the provisional line. At this time, it may select any of the approximate lines al1 to al4 based on the difference between the slope 54 and the slope of the approximate lines al1 to al4. In the example depicted in FIG. 5C, the approximate lines al1 and al3 are selected.

Figure 6:
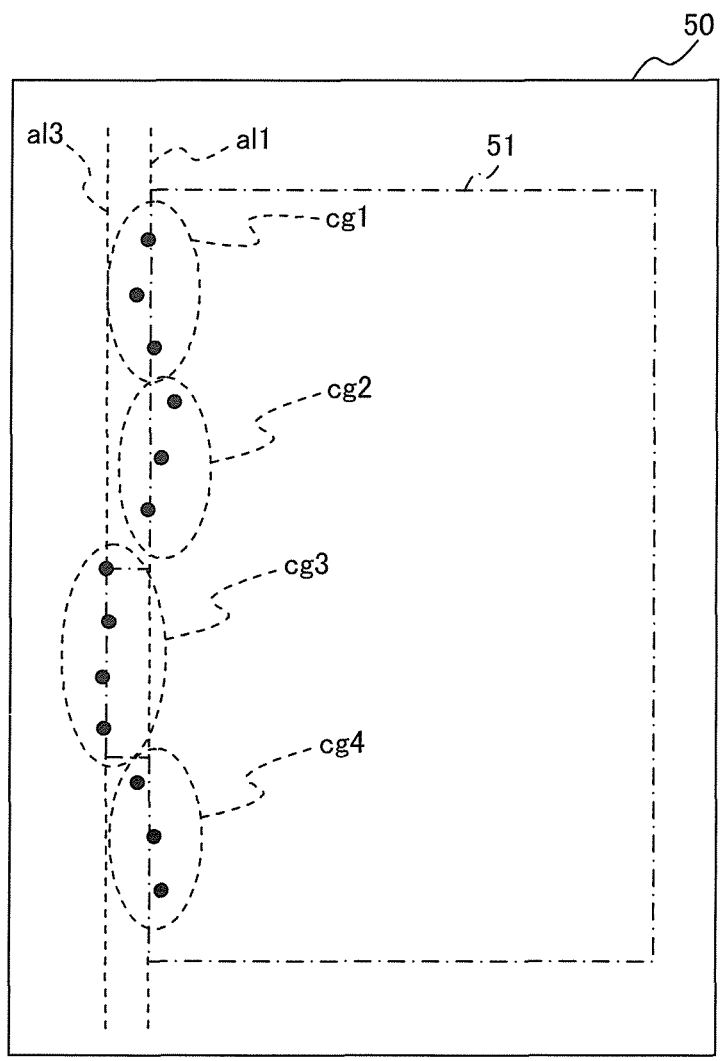
FIG. 6 is a diagram illustrating the processing depicted in FIG. 3.

The image processing system 1 select one of the selected approximate lines in accordance with a predetermined setting for designating outside or inside of the document region. In the description that follows, the setting for designating outside or inside of the document region is denoted as "crop setting". In the example of FIG. 6, if the crop setting designates the outside of the document region, the approximate line al3 lying more on the outside of the document region is selected. If the crop setting designates the inside of the document region, the approximate line al1 lying more on the inside of the document region is selected. The image processing system 1 determines the approximate line selected in accordance with the crop setting as the boundary line for cropping the document region 51 from the image data 50.

At step S108, the image processing system 1 determines whether or not the boundary line for cropping the document region has been determined on all the sides. If there is a side on which the boundary line has not been determined (step S108: N), the processing proceeds to step S109. If the boundary line for cropping the document region has been determined on all the sides (step S108: Y), the processing proceeds to step S110. At step S109, the image processing system 1 selects the side on which the boundary line has not been determined, and returns the processing to step S104.

At step S110, the image processing system 1 crops the image of the document region from the inputted image data at position of the boundary lines determined at step S107 for all the sides.

2.2. Construction of Apparatus

Figure 7:
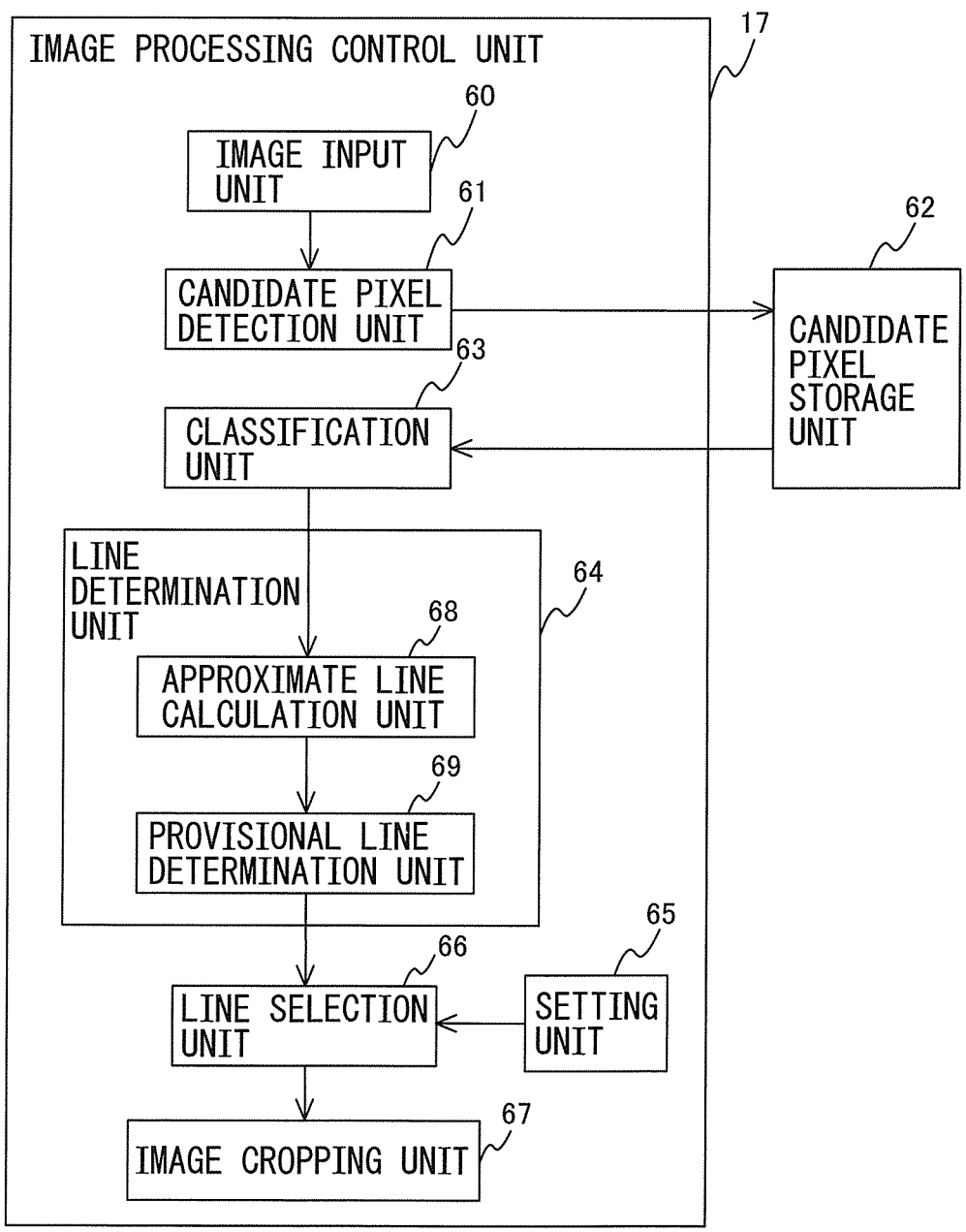
FIG. 7 is a diagram illustrating a first example of the exemplary construction of the image processing control unit.

Next, the construction of the image processing control unit 17 will be described. FIG. 7 is a diagram illustrating a first example of the exemplary construction of the image processing control unit 17. The image processing control unit 17 includes an image input unit 60, a candidate pixel detection unit 61, a classification unit 63, a line determination unit 64, a setting unit 65, a line selection unit 66, and an image cropping unit 67. FIG. 7 illustrates mainly the functions related to the description that follows. Further, the image processing control unit 17 may include constituents other than the depicted constituents. The candidate pixels stored in the candidate pixel storage unit 62 are stored in a memory 12.

In other example, a part or all of the processing performed by the image input unit 60, the candidate pixel detection unit 61, the classification unit 63, the line determination unit 64, the setting unit 65, the line selection unit 66 and the image cropping unit 67 may be executed by CPU 11 in place of the image processing control unit 17. In other example, a part or all of the processing may be executed by CPU 31 of the computer 30. The computer 30 may store the candidate pixels in the memory 33 as the candidate pixel storage unit 62.

The computer program for causing CPU 31 to execute theses information processing may be recorded in a computer-readable, non-transitory medium such as a CD ROM, a DVD ROM, a flexible disc drive, a CD-R or a DVD-R, a MO, a flash memory drive, or the like and read by the medium reading unit 36 and installed in the auxiliary storage unit 32 by using a well known setup program or the like. Also, the computer program for causing CPU 31 to execute theses information processing may be downloaded from a network via a network interface (not depicted) and installed in the auxiliary storage unit 32.

The image input unit 60 takes image data 50 as input. The candidate pixel detection unit 61 detects candidate pixels for each of the sides of the document region. The candidate pixel detection unit 61 stores the detected pixels in the candidate pixel storage unit 62. The classification unit 63 classifies the candidate pixels into a plurality of different coordinate groups.

The line determination unit 64 includes an approximate line calculation unit 68 and a provisional line determination unit 69. The approximate line calculation unit 68 calculates respective approximate lines for the boundary line 53 based on candidate pixels belonging to each of the coordinate groups. The provisional line determination unit 69 generates a line group for each of the approximate lines. The provisional line determination unit 69 selects a line group having the largest number of candidate pixels from among the generated line groups, and determines a provisional line based on the selected line group.

The line determination unit 64 selects one or more lines from among the approximate lines based on the provisional line determined by the provisional line determination unit 69. When there is a tab on the side to be processed, the line determination unit 64 selects an approximate line obtained from the coordinate groups of the candidate pixels constituting the boundary line of the tab portion, and an approximate line obtained from the coordinate groups of the candidate pixels constituting the boundary line of the non-tab portion.

Figure 8A:
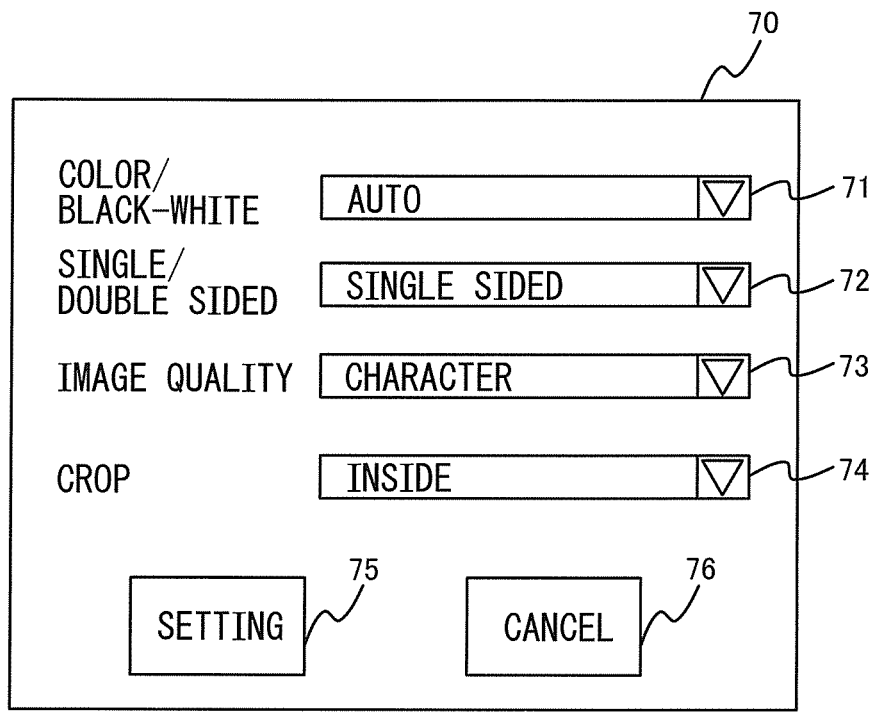
FIG. 8A is a diagram illustrating the example of setting screen view of crop setting.

The setting unit 65 imparts a crop setting, i.e., a setting regarding the designation of outside or inside of the document region, to the line selection unit 66. In an example, the crop setting may be determined fixedly, for example, at the time of shipment from the factory. Also, in an example, the setting unit 65 may receive the crop setting inputted by a user, and impart it to the line selection unit 66. The setting unit 65 may receive the crop setting inputted by a user via the setting screen view displayed on the display device of the image reading device 10 or the computer 30. An example of setting screen view is depicted in FIG. 8A.

The setting screen view 70 includes, for example, the first combo box 71 to the fourth combo box 74, a setting button 75, and a cancel button 76. The first combo box 71 designates the color mode of image data. The second combo box 72 designates whether the document is a double sided or a single-sided document. The third combo box 73 designates image quality of the document. The fourth combo box designates the crop setting.

Figure 8B:
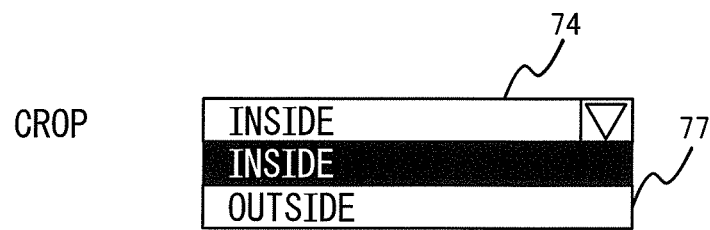
FIG. 8B is a diagram illustrating the example of setting screen view of crop setting.

FIG. 8B is a diagram illustrating an example of the fourth combo box 74 for designating the crop setting. The fourth combo box 74 includes a menu 77 having "inside" and "outside" of the document as entries. The fourth combo box 74 is adapted to receive, in response to the operation of the input unit 34 of the computer 30 by a user, selective input of either one of the entries. In other example, in place of "inside" of FIG. 8B, "default" or "default (inside)" may be displayed. Similarly, in place of "outside" of FIG. 8B, "tab" or "tab (outside)" may be displayed.

Referring to FIG. 7, the line selection unit 66 selects one of the approximate lines selected by the line determination unit 64 in accordance with the crop setting designated by the setting unit 65 as the boundary line for cropping document region from image data. When the crop setting designates the outside of the document region, the line selection unit 66 selects an approximate line more on the outside of the document region from among the approximate lines determined by the line determination unit 64. When the crop setting designates the inside of the document region, the line selection unit 66 selects an approximate line more on the inside of the document region from among the approximate lines determined by the line determination unit 64.

The image cropping unit 67 crops an image of the document region from the inputted image data at the position of the boundary line selected by the line selection unit 66 on all the sides of the document region. The image that is cropped by the image cropping unit 67 is outputted to the computer 30.

2.3. Image Processing 2.3.1. Coordinate Group Generation Processing

Next, the processing performed by each of the constituents of the image processing control unit 17 will be described. In the description that follows, the processing for determining the boundary line on the left side of the document region will be described as an example. The boundary line can be determined similarly on the right side. By changing the direction for scanning the candidate pixels in generating coordinate groups by 90°, the boundary line can be determined similarly on the upper side and lower side.

Figure 9:
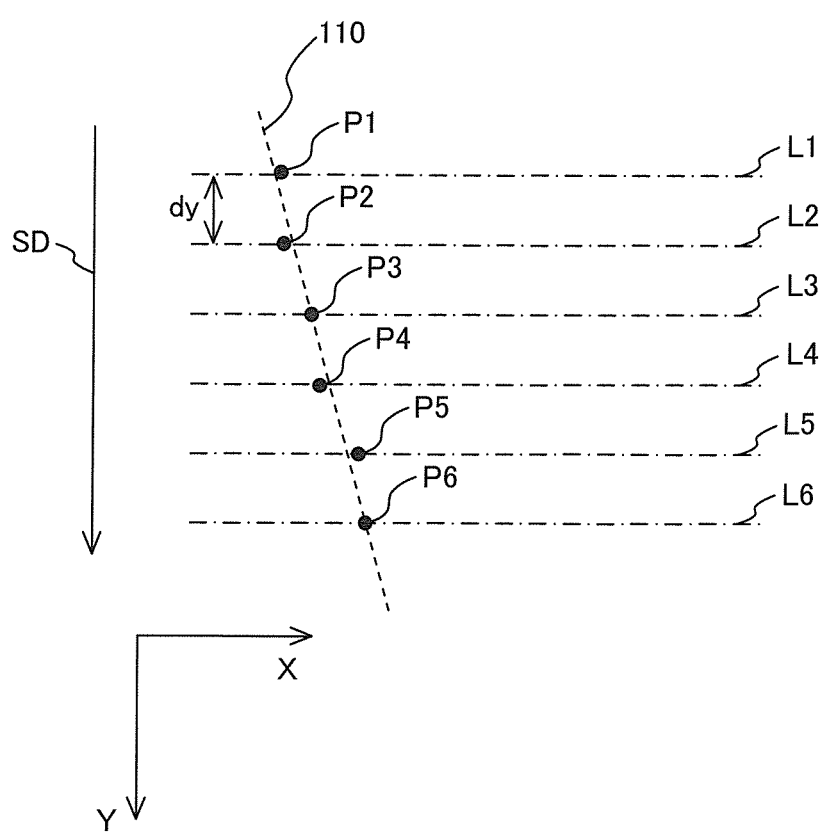
FIG. 9 is a diagram illustrating the candidate pixel detected by the candidate pixel detection unit.

The classification unit 63 generates coordinate groups by classifying the candidate pixels detected by the candidate pixel detection unit 61 into a plurality of different groups. FIG. 9 is a diagram illustrating the candidate pixels detected by the candidate pixel detection unit 61. The candidate pixel detection unit 61 detects candidate pixels P1 to P6, . . . of the boundary line 110 on the detection lines L1 to L6, . . . . The detection lines L1 to L6, . . . are arranged in the scanning direction SD from upper portion to lower portion of image data in a prescribed number of pixels dy.

In the description that follows, the direction from upper portion to lower portion of image data may be denoted as Y-axis direction, and the direction from left to right portion may be denoted as X-axis direction. Coordinates of a point in X-axis direction and in Y-axis direction may be denoted as X-coordinate and Y-coordinate, respectively.

The classification unit 63 successively changes the focused candidate pixel focused to be processed (hereinafter denoted as "focused candidate pixel") in the scanning direction SD to a continuing candidate pixels P1, P2, . . . P(i−1), Pi, P(i+1), . . . . Thus, the classification unit 63 scans the focused candidate pixels in the scanning direction SD. While the classification unit 63 successively changes the focused candidate pixel, it determines whether or not the focused candidate pixel is to be classified into the same coordinate group as the candidate pixel on the detection line immediately above it.

Figure 10:
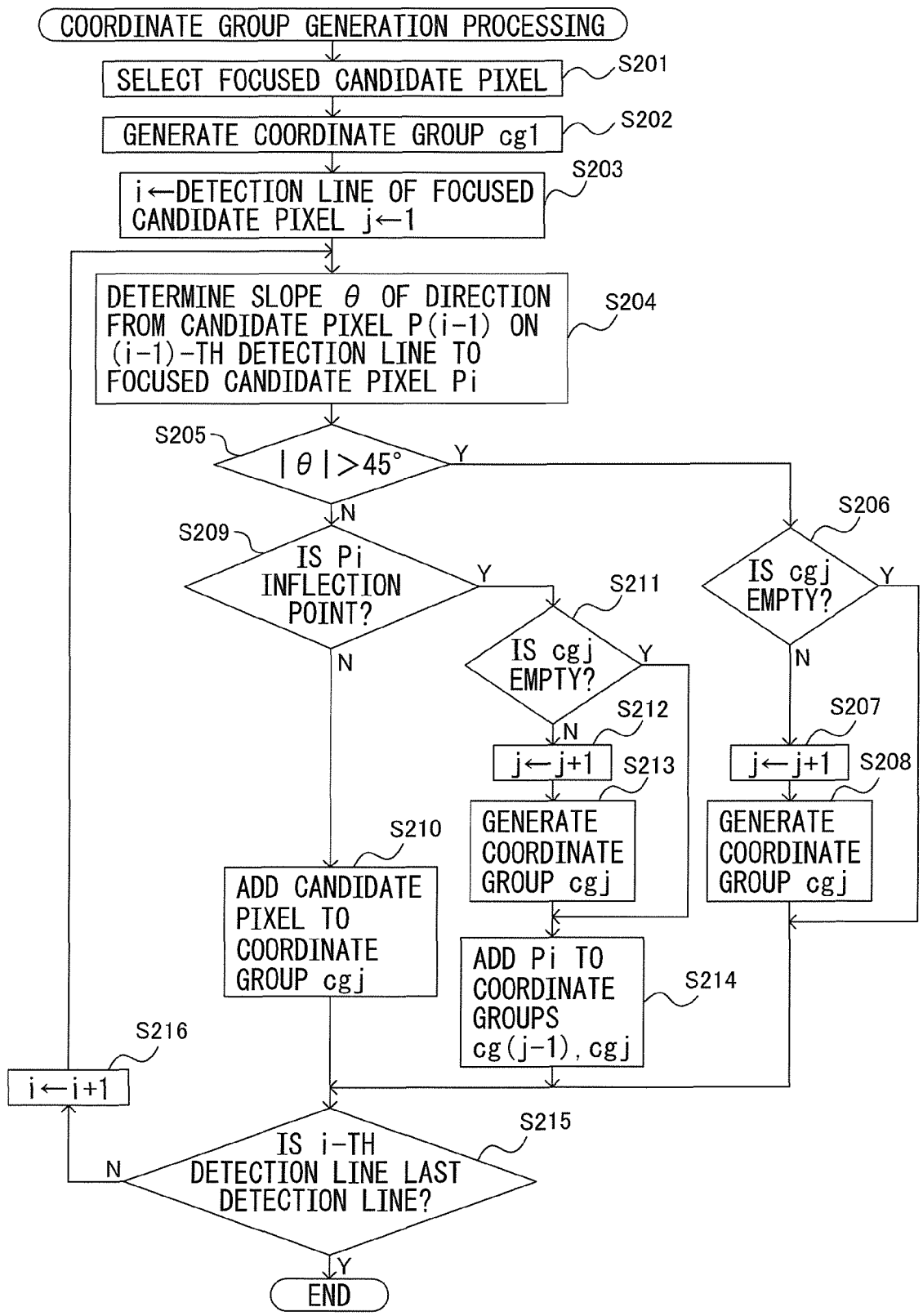
FIG. 10 is a diagram illustrating the coordinate group generation processing performed by the classification unit.

FIG. 10 is a diagram illustrating a first example of the coordinate group generation processing performed by the classification unit 63. At step S201, the classification unit 63 selects the first focused candidate pixel to start the processing. For example, the classification unit 63 may select the second or lower candidate pixel from the top as the first focused candidate pixel to start the processing. This is for determining positional relation between the focused candidate pixel and a candidate pixel detected on the detection line immediately above at steps S205 and S206 to be described later.

At step S202, the classification unit 63 generates a first coordinate group cg1. At step S203, the classification unit 63 substitutes the number of the detection line of the focused candidate pixel selected at step S201 into the variable "i" indicating the detection line of the focused candidate pixel. The classification unit 63 substitutes "1" into the index "j" referring to the coordinate group being formed at present.

Figure 11A:
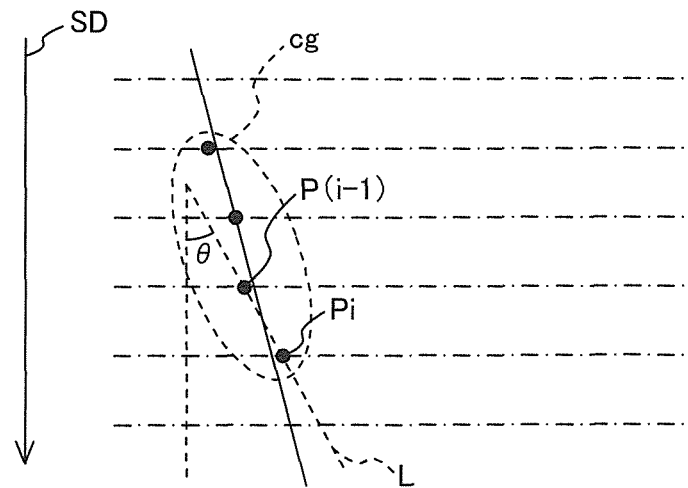
FIG. 11A is a diagram illustrating the coordinate group generation processing.
Figure 11B:
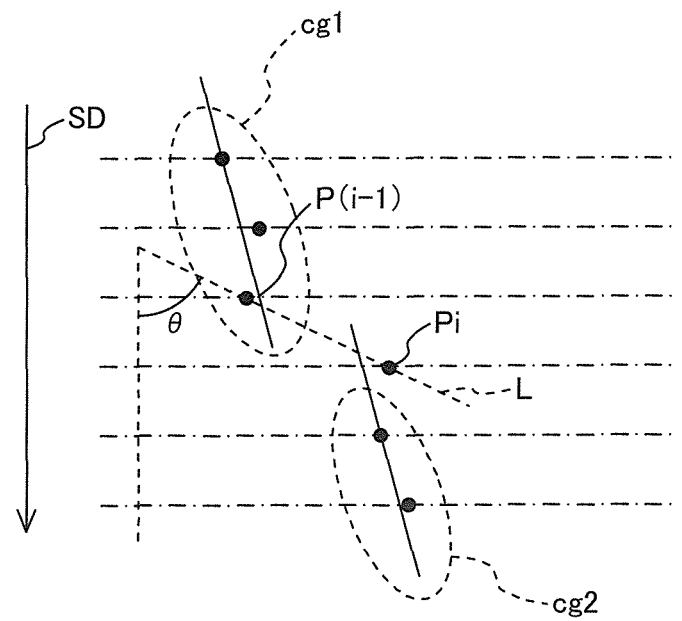
FIG. 11B is a diagram illustrating the coordinate group generation processing.

At step S204, the classification unit 63 determines the slope $\theta$ of the direction from the candidate pixel P(i−1) on the (i−1)-th detection line to the focused candidate pixel Pi. Referring to FIG. 11A, the slope $\theta$ of the direction from the candidate pixel P(i−1) to the candidate pixel Pi will be described. In FIG. 11A and FIG. 11B, a long dashed short dashed line indicates a detection line.

The slope $\theta$ is defined as the angle which the line L connecting the candidate pixel P(i−1) and the candidate pixel Pi makes with the scanning direction SD. Here, it is supposed that the document is read in a state inclined relative to the image sensor 13 of the image reading device 10 up to the maximum angle of 45°. Thus, a line connecting candidate pixels on one boundary line is supposed to be inclined at 45° at the maximum. If a line connecting candidate pixels is inclined more than 45°, these candidate pixels are not judged to be on one boundary line.

Therefore, at step S205, the classification unit 63 determines whether or not the slope $\theta$ is greater than 45°. If the slope $\theta$ is not greater than 45°, as depicted in FIG. 11A, the focused candidate pixel Pi is included in the same coordinate group cg as the candidate pixel P(i−1) on the detection line immediately above. On the other hand, if the slope $\theta$ is greater than 45°, as depicted in FIG. 11B, the focused candidate pixel Pi is not included in the same coordinate group cg as the candidate pixel P(i−1) on the detection line immediately above. Since separation in Y-axis direction of the detection lines is a constant value dy, the classification unit 63 may determine whether or not the slope θ is greater than 45° according as whether or not the X-coordinate between the candidate pixels exceeds dy.

Referring to FIG. 10, if the slope θ is greater than 45° (step S205: Y), the processing proceeds to operation S206. If the slope θ is not greater than 45° (step S205: N), the processing proceeds to operation S209. At step S206, the classification unit 63 determines whether or not the coordinate group cgj being formed at present is empty. If cgj is empty (step S206: Y), the classification unit 63 does not generate a new coordinate group, and the processing proceeds to step S215. If cgj is not empty (step S206: N), the classification unit 63 increments the index j at step S207, and generates a new coordinate group cgj at step S208. Thereafter, the processing proceeds to step S215.

In this example, the focused candidate pixel Pi is not included in the newly formed coordinate group cgj generated at step S208. Therefore, if, as depicted in FIG. 11B, the slope θ is greater than 45°, the focused candidate pixel Pi does not belong to the new coordinate group cg2, nor to the coordinate group cg1 to which the candidate pixel P(i−1) belongs. In another example, the classification unit 63 may include the focused candidate pixel Pi in the new coordinate group generated at step S208.

As the case in which the slope of the line connecting adjoining candidate pixels exceeds 45°, following two cases, for example, can be supposed.

Figure 12A:
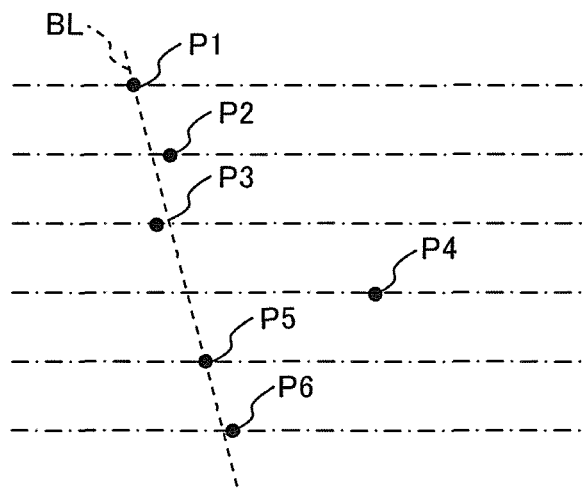
FIG. 12A is a diagram illustrating the case where the slope θ of the line connecting candidate pixels exceeds 45°.

(1) The candidate pixel is incorrectly detected due to noise. In this case, the position of the incorrectly detected candidate pixel is detected at a position distant from the proper boundary line. In the example depicted in FIG. 12A, among the candidate pixels P1 to P6, the candidate pixel P4 is detected at a distant position distant from the proper boundary line BL.

Figure 12B:
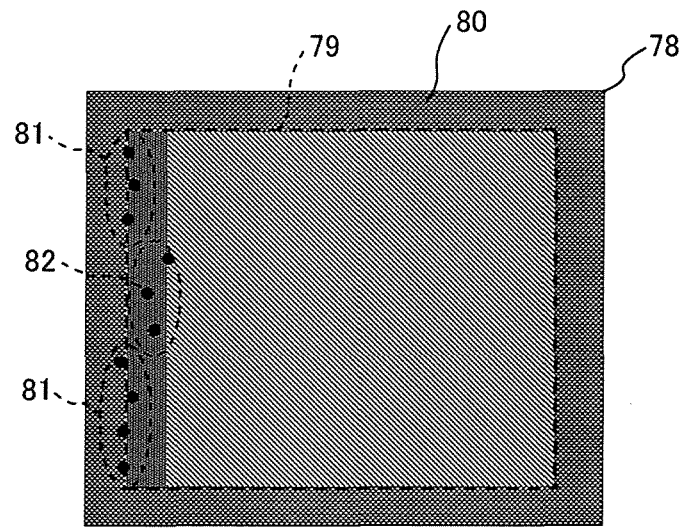
FIG. 12B is a diagram illustrating the case where the slope θ of the line connecting candidate pixels exceeds 45°.

As an example of occurrence of such incorrect detection, a case where brightness difference between the document region and the background region of the image data is small can be mentioned. FIG. 12B is a schematic diagram illustrating image data with small brightness difference between the document region and the background region. Image data 78 include a document region 79 and a background region 80, and the brightness difference between the document region 70 and the background region 80 is relatively small. In such case, it is difficult to distinguish the brightness change in the boundary between the document region 79 and the background region 80 from the brightness change in the document region 79. Therefore, as depicted in FIG. 12B, for example, while in the portion denoted by reference numeral 81 the candidate pixel is detected normally at the position of the boundary line, a candidate pixel may be incorrectly detected at a position distant from the boundary line in the portion denoted by reference numeral 82.

If incorrectly detected candidate pixel is used when calculating approximate line for the boundary line, it may cause an error in the slope of the approximate line. If the classification unit 63 does not include the incorrectly detected candidate pixel in the same coordinate group as other candidate pixels, an error due to incorrectly detected candidate pixel can be prevented from arising in the slope of the approximate line calculated based on the candidate pixel belonging to the coordinate group.

Figure 12C:
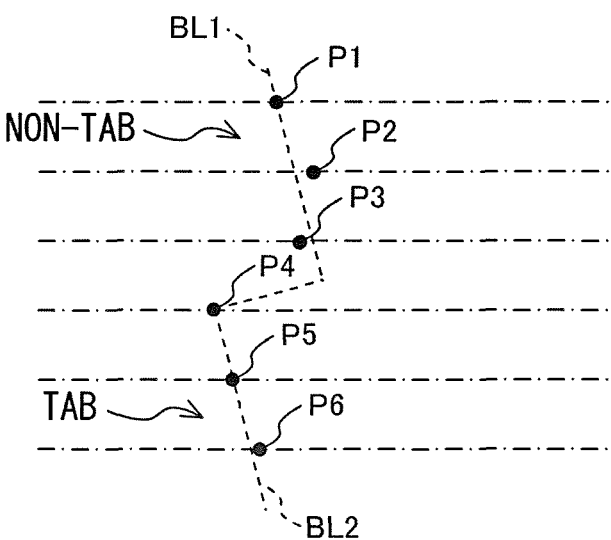
FIG. 12C is a diagram illustrating the case where the slope θ of the line connecting candidate pixels exceeds 45°.

(2) A case where there is a tab on the side, and one of the candidate pixel is detected at the tab portion and the other candidate pixel is detected at non-tab portion is possible. In this case, these candidate pixels are not on the same boundary line. FIG. 12C is a schematic diagram illustrating candidate pixels detected at the tab portion and at the non-tab portion. While the candidate pixels P1 to P3 are detected on the boundary line BL1 of non-tab portion, the candidate pixels P4 to P6 are detected on the boundary line BL2 of tab portion.

Since the candidate pixels P1 to P6 are not detected on the same line, the slope of an approximate line calculated for the boundary line based on these candidate pixels gives rise to an error. The classification unit 63 does not include the candidate pixels detected in the tab portion and the candidate pixels detected in non-tab portion in the same coordinate group, and therefore an error of the slope of an approximate line due to calculation by mixing these candidate pixels in one group can be prevented.

Referring to FIG. 10, at step S209, the classification unit 63 determines whether or not the focused candidate pixel Pi is an inflection point of the boundary line. That is, the classification unit 63 determines whether or not the boundary line deflects before and after the focused candidate pixel Pi.

Figure 13A:
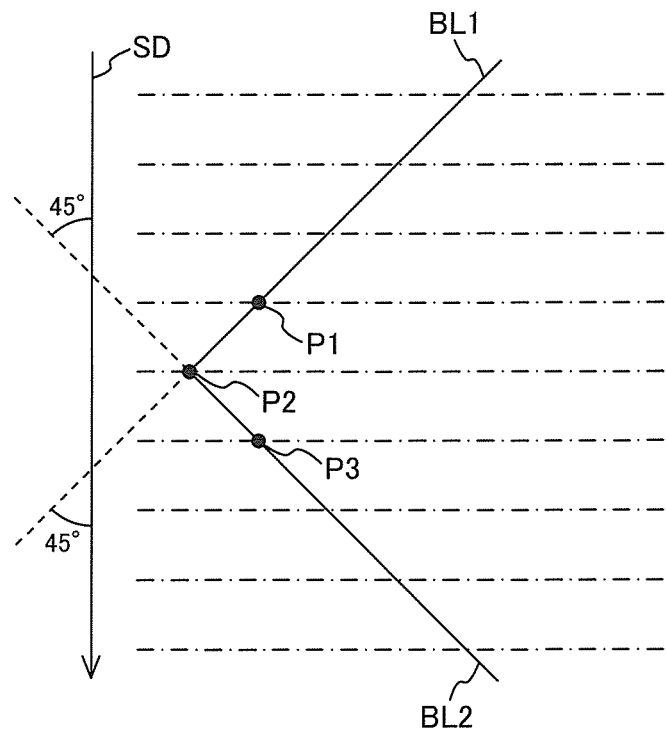
FIG. 13A is a diagram illustrating the state of the candidate pixels when the document is read with an inclination of 45° relative to the image scanner.

As has been described above, the document may be read in an inclined state relative to the image sensor of the image reading device at 45° in the maximum. FIG. 13A illustrates the state of the candidate pixel when the document is read in an inclined state at 45° in the maximum. The point P1 is the candidate pixel detected on a boundary line BL1 on one side of the document. The point P3 is the candidate pixel detected on a boundary line BL2 on other side of the document. The candidate pixel P2 is the candidate pixel detected at the corner where the sides BL1 and BL2 intersect.

The slope of the line from the candidate pixel P1 to P2 is 45°. Thus, if the focused candidate pixel is P2, the determination at step S205 is "No (N)", and the classification unit 63 does not separate the candidate pixels P1 and P2 into different coordinate groups. Since the slope of the line from the candidate pixel P2 to P3 is also 45°, if the focused candidate pixel is P3, from the determination at step S205, the classification unit 63 does not separate the candidate pixels P2 and P3 into different coordinate groups. Therefore, from the determination at step S205, the classification unit 63 does not separate the candidate pixels P1 and P3 into different coordinate groups.

Since the candidate pixels P1 and P3 are not detected on the same line, if an approximate line is calculated for the boundary line based on these candidate pixels, an error may be produced in the slope of the approximate line. Therefore, the classification unit 63 determines whether or not the focused candidate pixel is an inflection point of the boundary line, and therefore that coordinate groups can be separated before and after the inflection point.

Figure 13B:
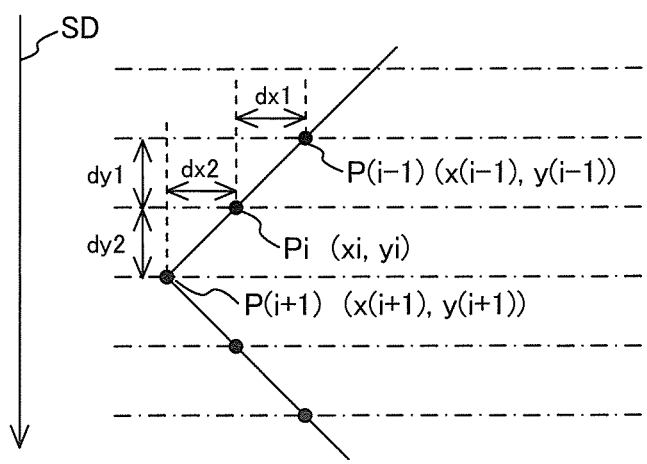
FIG. 13B is a diagram illustrating the state of the candidate pixels when the document is read with an inclination of 45° relative to the image scanner.

FIG. 13B is a diagram illustrating the method of detecting an inflection point. The points Pi, P(i−1), and P(i+1) are the focused candidate pixel, the candidate pixel on the detection line immediately above the focused candidate pixel, and the candidate pixel on the detection line immediately below the focused candidate pixel, respectively. Let the coordinate of the focused candidate pixel Pi be (xi, yi), the coordinate of the candidate pixel P(i−1) be (x(i−1), y(i−1)), and the coordinate of the candidate pixel P(i+1) be (x(i+1), y(i+1)).

The classification unit 63 calculates second differential value A of the locus of the candidate pixel in accordance with the following equation (1).

$$A = (dx2/dy2) - (dx1/dy1) \quad (1)$$

$$dx1 = xi - x(i-1), dy1 = yi - y(i-1)$$

$$dx2 = x(i+1) - xi, dy2 = y(i+1) - yi$$

If the focused candidate pixel is not an inflection point, the slopes of the boundary line dx1/dy1, dx1/dy2 are constant, and therefore the absolute value |A| of the second differential value A is relatively small. If the focused candidate pixel is an inflection point, the absolute value |A| is relatively large. The classification unit 63 determines whether or not the focused candidate pixel is an inflection point by determining whether or not the absolute value |A| is larger than a prescribed threshold.

Referring to FIG. 10 and FIGS. 14A to 14C, the processing for dividing the coordinate group before and after an inflection point will be described. If the focused candidate pixel is not an inflection point (step S209: N), the processing proceeds to step S210. At step S210, the classification unit 63 adds the focused candidate pixel Pi to the coordinate group cg1 being formed. Thereafter, the processing proceeds to step S215.

Figure 14A:
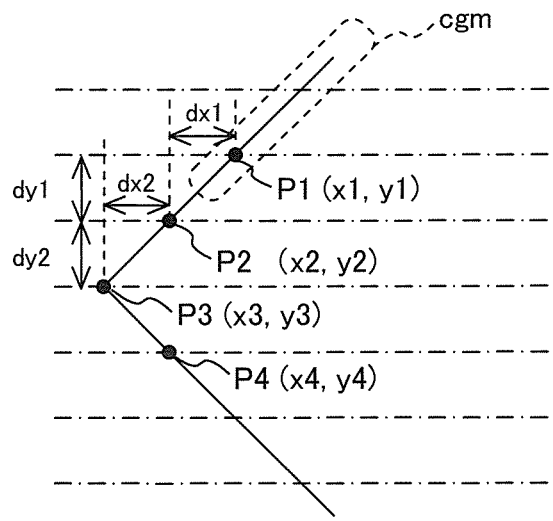
FIG. 14A is a diagram illustrating the processing when the document is read with an inclination of 45° relative to the image scanner.

The state before an inflection point is detected is depicted in FIG. 14A. The points P1 to P4 are the candidate pixel detected at the corner of the document. Coordinates of the candidate pixel P1 to P4 are, respectively, (x1, y1), (x2, y2), (x3, y3), and (x4, y4). The focused candidate pixel Pi is P2, and the candidate pixel P1 on the detection line immediately above it belongs to the coordinate group cgm. Since the focused candidate pixel P2 is not an inflection point, the absolute value |A| of the second differential calculated from the following equation is relatively small and does not exceed the detection threshold Th1.

$$|A|=|(x3-x2)/(y-y2)-(x2-x1)/(y2-y1)|$$

As a result, the processing proceeds to step S210. At step S210, the focused candidate pixel p2 is added to the coordinate group cgm.

Figure 14B:
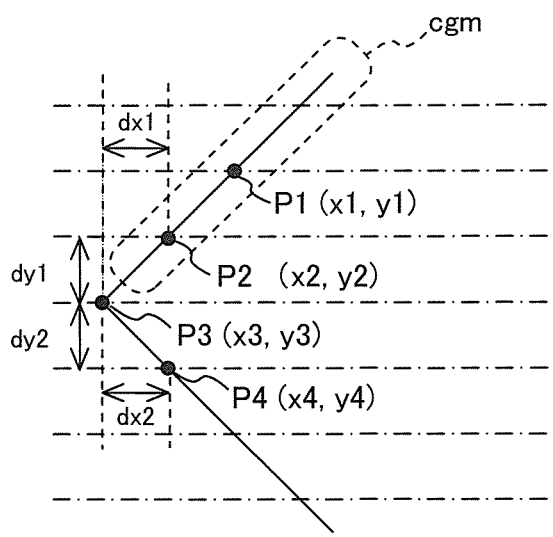
FIG. 14B is a diagram illustrating the processing when the document is read with an inclination of 45° relative to the image scanner.

Then, the focused candidate pixel Pi is changed from the candidate pixel P2 to P3. FIG. 14B is a diagram illustrating the second differential when the focused candidate pixel Pi is the candidate pixel P3. Since the focused candidate pixel P3 is an inflection point, the absolute value |A| of the second differential calculated from the following equation is relatively large and exceeds the detection threshold Th1.

$$|A|=|(x4-x3)/(y4-y3)-(x3-x2)/(y3-y2)|$$

In FIG. 10, if the focused candidate pixel Pi is an inflection point (step S209: Y), the processing proceeds to step S211. At step S211, the classification unit 63 determines whether or not the coordinate group cgj being formed at present is empty. If cgj is empty (step s211: Y), the classification unit 63 does not generate a new coordinate group, and the processing proceeds to step S214. If cgj is not empty (step S211: N), the classification unit 63 increments the index j at step S212, and generates a new coordinate group cgj at step S213. At step S214, the classification unit 63 adds the candidate pixel Pi to both coordinate groups cg(j−1) and cgj before and after the inflection point. Therefore, the processing proceeds to step S215.

Figure 14C:
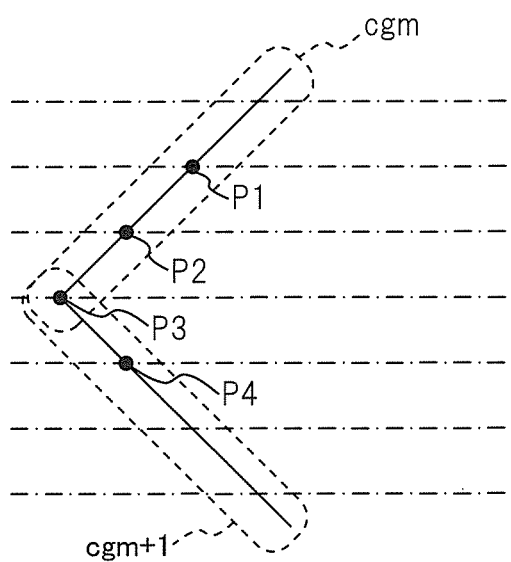
FIG. 14C is a diagram illustrating the processing when the document is read with an inclination of 45° relative to the image scanner.

FIG. 14C is a diagram illustrating the state in which an inflection point P3 is detected so that a new coordinate group is generated in addition to the coordinate group cgm. The candidate pixel P3 at the inflection point is added to both coordinate groups, cgm and cgm+1.

Referring to FIG. 10, at step S215, the classification unit 63 determines whether or not the detection line of the focused candidate pixel Pi is the last detection line. If the detection line of the focused candidate pixel Pi is the last detection line (step S215: Y), the processing is terminated. If the detection line of the focused candidate pixel Pi is not the last detection line (step S215: N), the processing proceeds to step S216. At step S216, the classification unit 63 advances the focused candidate pixel Pi to the candidate pixel on the next detection line, and returns the processing to step S204.

2.3.2. Line Group Generation Processing

Next, the line group determination processing performed by the line determination unit 64 will be described. FIG. 15 is a diagram illustrating the line group determination processing performed by the line determination unit 64. At step S301, the line determination unit 64 substitutes "1" into the index "j" referring to the focused coordinate group cgj to be processed. In the description that follows, the pixel group cgj may be denoted as "focused coordinate group cgj". At step S302, the approximate line calculation unit 68 calculates an approximate line alj for the boundary line 53 based on the candidate pixels belonging to the focused coordinate group cgj. At step s303, the provisional line determination unit 69 generates a line group lgj including the candidate pixel belonging to the focused coordinate group cgj.

At step S304, the provisional line determination unit 69 substitutes "1" into the index "k" referring to the coordinate group. At step S305, the provisional line determination unit 69 determines whether or not the coordinate group cgk is the same as the focused coordinate group cgj. If the coordinate group cgk is not the same as the focused coordinate group cgj (step S305: Y), the processing proceeds to step S306. If the coordinate group cgk is the same as the focused coordinate group cgj (step S305: N), steps S306 to S308 are skipped, and the processing proceeds to step S309.

Figure 16A:
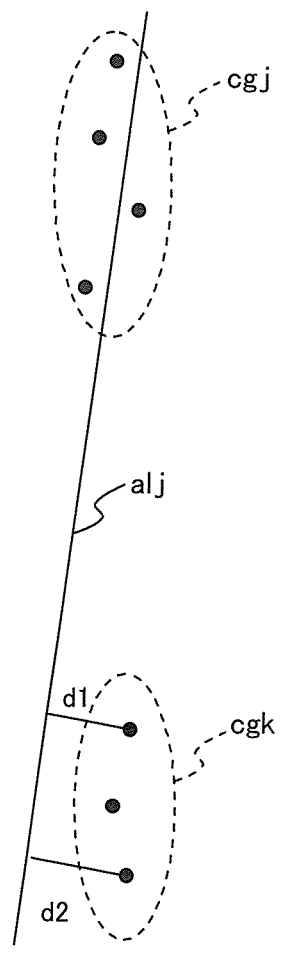
FIG. 16A is a diagram illustrating the method of calculating the distance between the approximate line and coordinate group.

At step S306, the provisional line determination unit 69 determines the distance d between the approximate line alj and the coordinate group cgk. Various calculation method can be used to calculate the distance d. FIG. 16A is a diagram illustrating a method for calculating the distance d between the approximate line alj and the coordinate group cgk. The provisional line determination unit 69 may calculate average of the distances d1 and d2 from end points of both ends of the coordinate group cgk to the approximate line alj as the distance d. The provisional line determination unit 69 may calculate either of the longer one or the shorter one of d1 and d2 as the distance d. The provisional line determination unit 69 may calculate the distance between some candidate pixel included in the coordinate group cgk and the approximate line alj as the distance d.

Figure 16B:
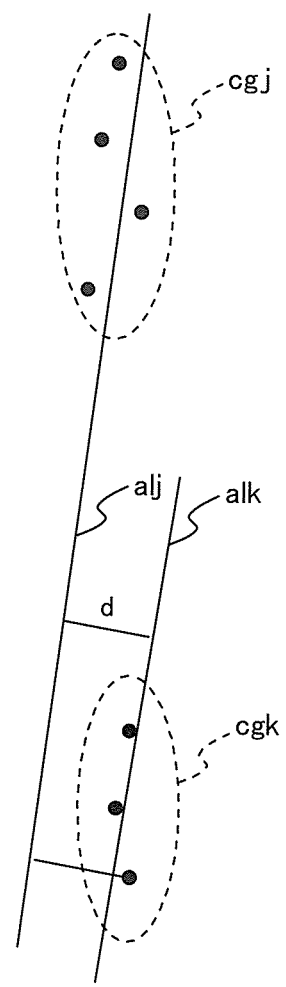
FIG. 16B is a diagram illustrating the method of calculating the distance between the approximate line and coordinate group.

FIG. 16B is another diagram illustrating the exemplary method for calculating the distance d between the approximate line alj and the coordinate group cgk. The provisional line determination unit 69 may calculate the distance between the approximate line alk calculated on the basis of the coordinate group cgk and the approximate line alj as the distance d.

At step S307, the provisional line determination unit 69 determines whether or not the distance d is equal to or less than a prescribed threshold Th2. If the distance d is equal to or less than the threshold Th2 (step S307: Y), the processing proceeds to step S308. If the distance d exceeds the threshold Th2 (step S307: N), step S308 is skipped, and the processing proceeds to step S309. At step S308. the provisional line determination unit 69 adds the candidate pixels of the coordinate group cgk to the line group lgj.

At step S309, the provisional line determination unit 69 increments the value of the index k. At step S310, the provisional line determination unit 69 determines whether or not the value of the index k exceeds the total number of coordinate groups CGN. If the value of k exceeds CGN (step S310; Y), the processing proceeds to step S311. If the value of k does not exceed CGN (step S310; N), the processing returns to step S305.

At step s311, the provisional line determination unit 69 increments the value of the index j of the focused coordinate group. At step s312, the provisional line determination unit 69 determines whether or not the value of the index j exceeds the total number of coordinate groups CGN. If the value of j exceeds CGN (step S312; Y), the processing is terminated. If the value of j does not exceed CGN (step S312; N), the processing returns to step S302.

Figure 17:
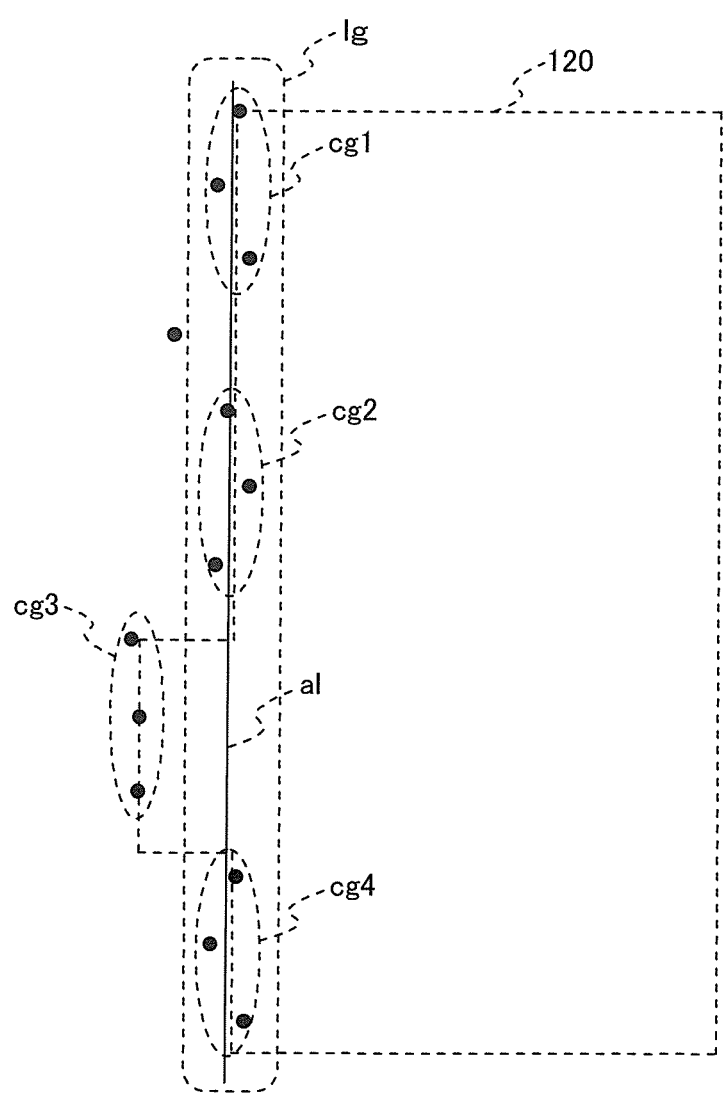
FIG. 17 is a diagram illustrating a line group.

The line group lgj formed by steps S301 to S312 described above will be described below. FIG. 17 is a diagram illustrating the line group. In FIG. 17, dotted line 120 denotes the document region, and a black dot indicates a candidate pixel. In the example depicted in FIG. 17, a plurality of coordinate groups cg1 to cg4 are formed, and the approximate line a1 is an approximate line of the boundary line of the document region calculated from the coordinate group cg1. The line group lg is a set of candidate pixels of the coordinate groups cg1, cg2, and cg4 within a prescribed distance from the approximate line alj.

The line group lg includes not only the candidate pixels belonging to one coordinate group cg1, but also candidate pixels of other coordinate groups cg2 and cg4 within a prescribed distance from the approximate line a1 of the boundary line calculated from these candidate pixels. Therefore, the provisional line determination unit 69 identifies those candidate pixels that are detected as the boundary points positioned on the same line, and yet are classified into different coordinate groups, as a set.

2.3.3. Provisional Line Determination Processing

Figure 18:
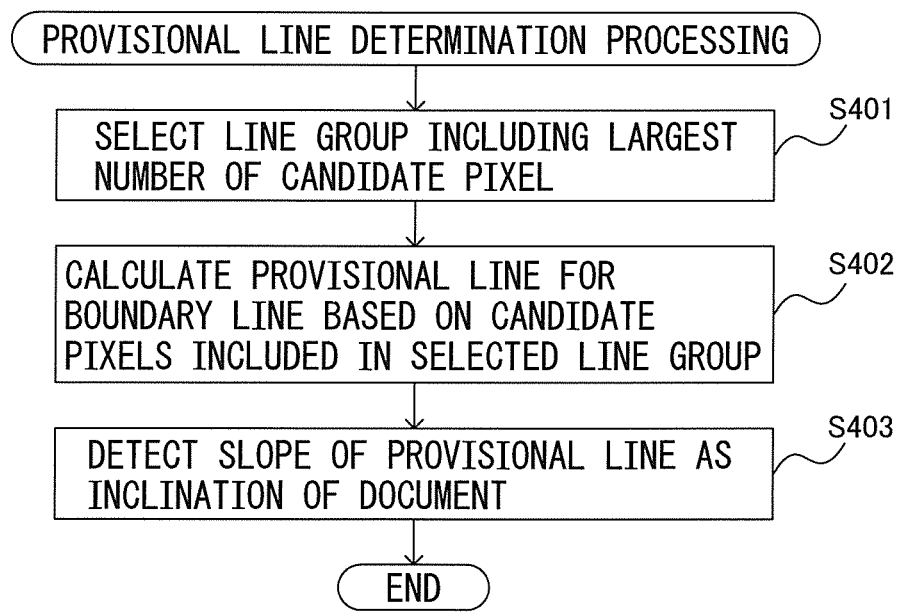
FIG. 18 is a diagram illustrating a first example of the provisional line determination processing performed by the line determination unit.

Next, the provisional line determination processing performed by the line determination unit 64 will be described. FIG. 18 is a diagram illustrating a first example of the provisional line determination processing performed by the line determination unit 64. At step S401, the provisional line determination unit 69 of the line determination unit 64 selects a line group having a largest number of candidate pixels from among the generated line groups. At step S402, the provisional line determination unit 69 calculates a provisional line for the boundary line of the document region based on the candidate pixels included in the line group selected at step S401. At step S403, the provisional line determination unit 69 detects the slope of the provisional line which is the angle between the scanning direction SD and the provisional line as the inclination of the document.

As described above, the classification unit 63 depicted in FIG. 7 classifies the candidate pixels into a plurality of coordinate groups so as not to include candidate pixels not detected on the same boundary line in the same coordinate group. The provisional line determination unit 69 classifies the candidate pixels so as to include the candidate pixels that have been detected on the boundary line positioned on the same line and have been classified in different coordinate groups into same line group. The provisional line determination unit 69 determines a provisional line based on the candidate pixels included in the line group including the largest number of candidate pixels. That is, the provisional line determination unit 69 determines a provisional line for the boundary line based on the candidate pixels detected on the boundary line on the same line having the largest number of detected candidate pixels. Therefore, the provisional line determination unit 69 can determine the slope of the boundary line, that is, the inclination of the document in high precision.

<2.3.4. Boundary Line Determination Processing>

Figure 19:
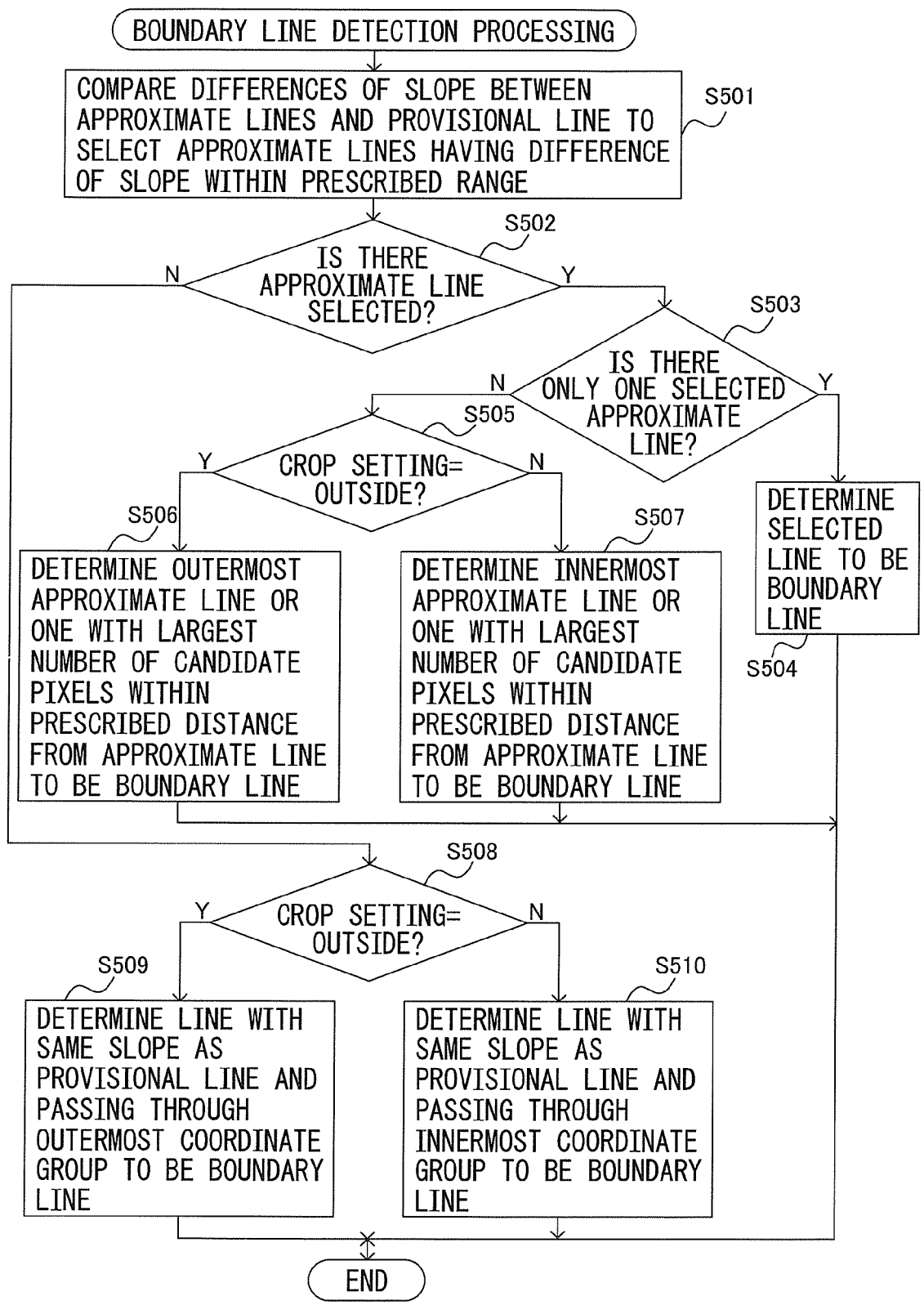
FIG. 19 is a diagram illustrating the boundary line determination processing performed by the line determination unit and the line selection unit.

Next, the boundary line determination processing performed by the line determination unit 64 and the line selection unit 66 will be described. FIG. 19 is a diagram illustrating the boundary line determination processing performed by the line determination unit 64 and the line selection unit 66. At step S501, the line determination unit 64 compares differences of the slope of the approximate lines and the provisional line, and selects one or more approximate lines for which the difference of slope is within a prescribed range.

Figure 20:
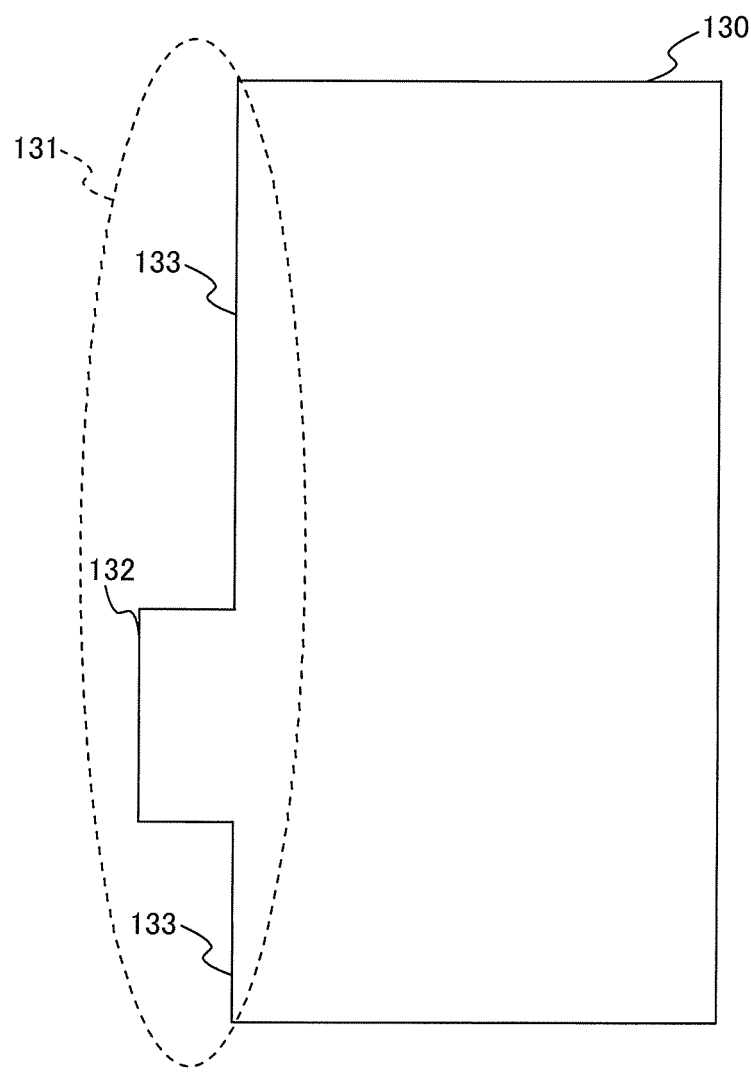
FIG. 20 is a diagram illustrating an approximate line in the case where there is a tab on the side.

An example of cases where a plurality of approximate lines are selected at step S501 will be illustrated below. FIG. 20 illustrates the document region having a tab on its side. On the side 131 of the document 130, there are a tab portion and a non-tab portion, and the boundary line 132 of the tab portion and the boundary line 133 of the non-tab portion are not on the same line, but have same slope.

When the coordinate group of the candidate pixels detected on the tab portion and the coordinate group of the candidate pixels detected on the non-tab portion are generated, the difference between the slopes of the approximate lines calculated from these coordinate groups and the slope of the provisional line becomes small. Therefore, the line determination unit 64 selects the approximate line for the boundary of the document region 130 in the tab portion and the approximate line for the boundary of the document region 130 in the non-tab portion, respectively.

At step S502, the line selection unit 66 determines whether or not there is an approximate line selected at step S501. If there is an approximate line selected (step S502: Y), the processing proceeds to step S503. If there is no approximate line selected (step S502: N), the processing proceeds to step S508.

At step S503, the line selection unit 66 determines whether or not there is only one approximate line selected. If there is only one approximate line selected (step S503: Y), the processing proceeds to step S504. If there are plural approximate lines selected (step S503: N), the processing proceeds to step S505. At step S504, the line selection unit 66 determines the selected approximate line to be the boundary line for cropping the document region. Thereafter, the processing is terminated.

At step S505, the line selection unit 66 determines whether or not the crop setting designated by the setting unit 65 designates the outside of the document region. If the crop setting designates the outside (step S505: Y), the processing proceeds to step S506. If the crop setting designates the inside (step S505: N), the processing proceeds to step S507.

At step S506, the line selection unit 66 determines the approximate line situated on the outermost side of the document region to be the boundary line for cropping the document region. Thereafter, the processing is terminated. On the other hand, at step S507, the line selection unit 66 determines the approximate line situated on the innermost side of the document region to be the boundary line for cropping the document region. Thereafter, the processing is terminated.

At step S506 and S507, the line selection unit 66 may compare the number of candidate pixels included in the line groups formed by the candidate pixels within a prescribed range from the respective approximate lines. And the line selection unit 66 may determine the approximate line forming the line group including the largest number of candidate pixels to be the boundary line for cropping the document region.

At step S508, the line selection unit 66 determines whether or not the crop setting designated by the setting unit 65 designates the outside of the document region. If the crop setting designates the outside (step S508: Y), the processing proceeds to step S509. If the crop setting designates the inside (step S508: N), the processing proceeds to step S510.

At step S509, the line selection unit 66 may determine a line having same slope as the provisional line and passing through some candidate pixels of the coordinate group situated on the outermost side of the document region to be the boundary line for cropping the document region. Thereafter, the processing is terminated. At step S510, the line selection unit 66 may determine a line having same slope as the provisional line and passing through some candidate pixels of the coordinate group situated on the innermost side of the document region to be the boundary line for cropping the document region.

At step S501, the line determination unit 64 may compare, in place of the slope of the approximate line calculated from the coordinate group, the slope of the approximate line for the boundary line calculated from the candidate pixel belonging to the line group with the slope of the provisional line, and may select the line group for which difference of the slope is within a prescribed range.

Also, at steps S504, S506 and S507, the line selection unit 66 may determine, in place of the approximate line calculated from the coordinate group, the approximate line for the boundary line calculated from the candidate pixels belonging to the line group to be the boundary line for cropping the document region.

Also, in place of the slope of the provisional line, the inclination of the document may be detected by other means. The inclination of the document may be detected, for example, by a prescribed document-inclination sensor (not depicted) provided in the image reading device 10.

2.4. Effect of the Example

In accordance with the present example, even if, among a plurality of candidate pixels detected as pixels constituting the boundary line between the document region and its outside, there is a candidate pixel detected at a position distant from the same line, the error produced in the slope of the approximate line for the boundary line calculated from the candidate pixels can be reduced.

For example, in the case where difference of brightness between the document region and the background region of the image data is small, an error in the slope of the approximate line for the boundary line due to candidate pixels incorrectly detected at positions distant from the boundary line can be reduced. Also, when the document region includes a tab, the boundary line in the tab portion and the boundary line in the non-tab portion are not on the same line. In accordance with the present example, even when candidate pixels are detected on these plural different boundary lines, an error produced in the slope of the approximate lines for the boundary line calculated from the candidate pixels can be prevented. As a result, an error produced in the slope of the boundary line for cropping the image of the document region from the image data can be reduced, and each side of the document region can be detected in high precision.

In accordance with the present example, when the document region includes a tab, either an image of the document including the tab portion or an image of the document not including the tab portion can be arbitrarily selected and can be cropping from the image data.

3. Second Example

Next, other example of the image processing system 1 will be described. FIGS. 21A to 21D are diagrams illustrating the processing performed by the other example of the image processing system 1. In FIGS. 21A to 21D, dotted line 130 indicates the document region, and black dots represent candidate pixels detected on the side 131. In the present example, the image processing system 1 calculates a plurality of approximate lines 132 to 135 for the boundary line on the side 131 between the document region and the outside. The image processing system 1 determines the distance between each candidate pixel and each approximate line 132 to 135.

Figure 21A:
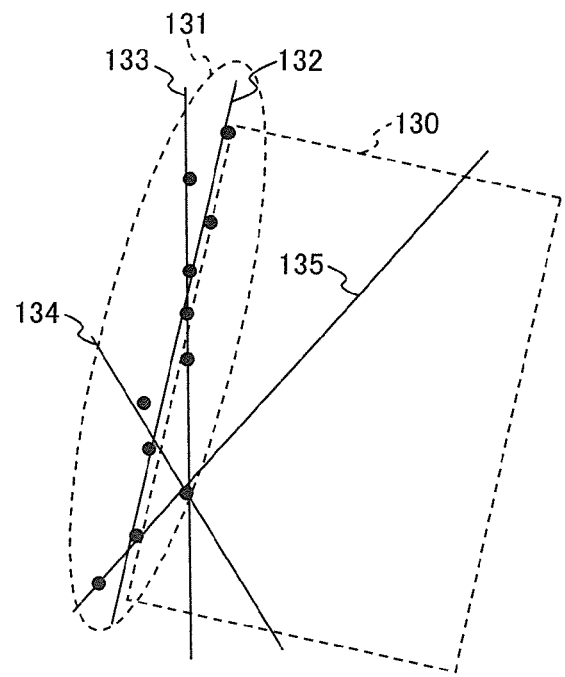
FIG. 21A is a diagram illustrating another example of the processing performed by the image processing system.
Figure 21B:
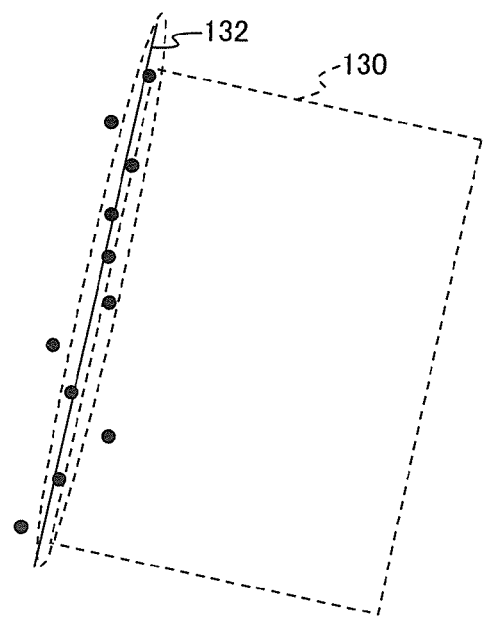
FIG. 21B is a diagram illustrating another example of the processing performed by the image processing system.
Figure 21C:
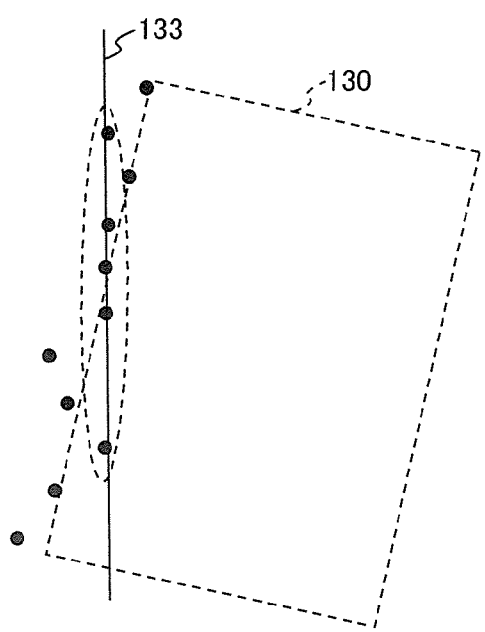
FIG. 21C is a diagram illustrating another example of the processing performed by the image processing system.
Figure 21D:
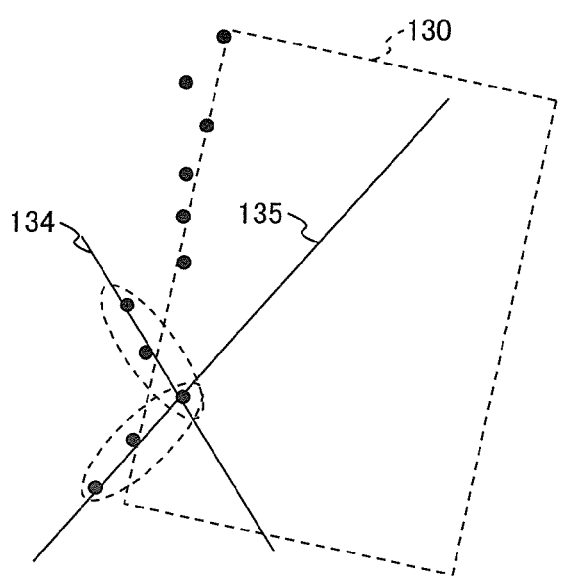
FIG. 21D is a diagram illustrating another example of the processing performed by the image processing system.

The image processing system 1 generates, for each approximate line 132 to 135, a coordinate group including the candidate pixels within a prescribed distance from the approximate line. FIG. 21B illustrates the coordinate group formed by the candidate pixels within a prescribed distance from the approximate line 132. FIG. 21C illustrates the coordinate group formed by the candidate pixels within a prescribed distance from the approximate line 133. FIG. 21D illustrates the coordinate groups formed by the candidate pixels within a prescribed distance from the approximate line 134 and 135.

Among the four coordinate groups formed by the candidate pixels within a prescribed distance from the approximate lines 132 to 135, the coordinate group of FIG. 21B formed by the candidate pixels within a prescribed distance from the approximate lines 132 includes the largest number of candidate pixels. The image processing system 1 determines the approximate line 132 to be the provisional line for the boundary on the side 131. The image processing system 1 may detect the slope of the provisional line as the inclination of the document.

Figure 22:
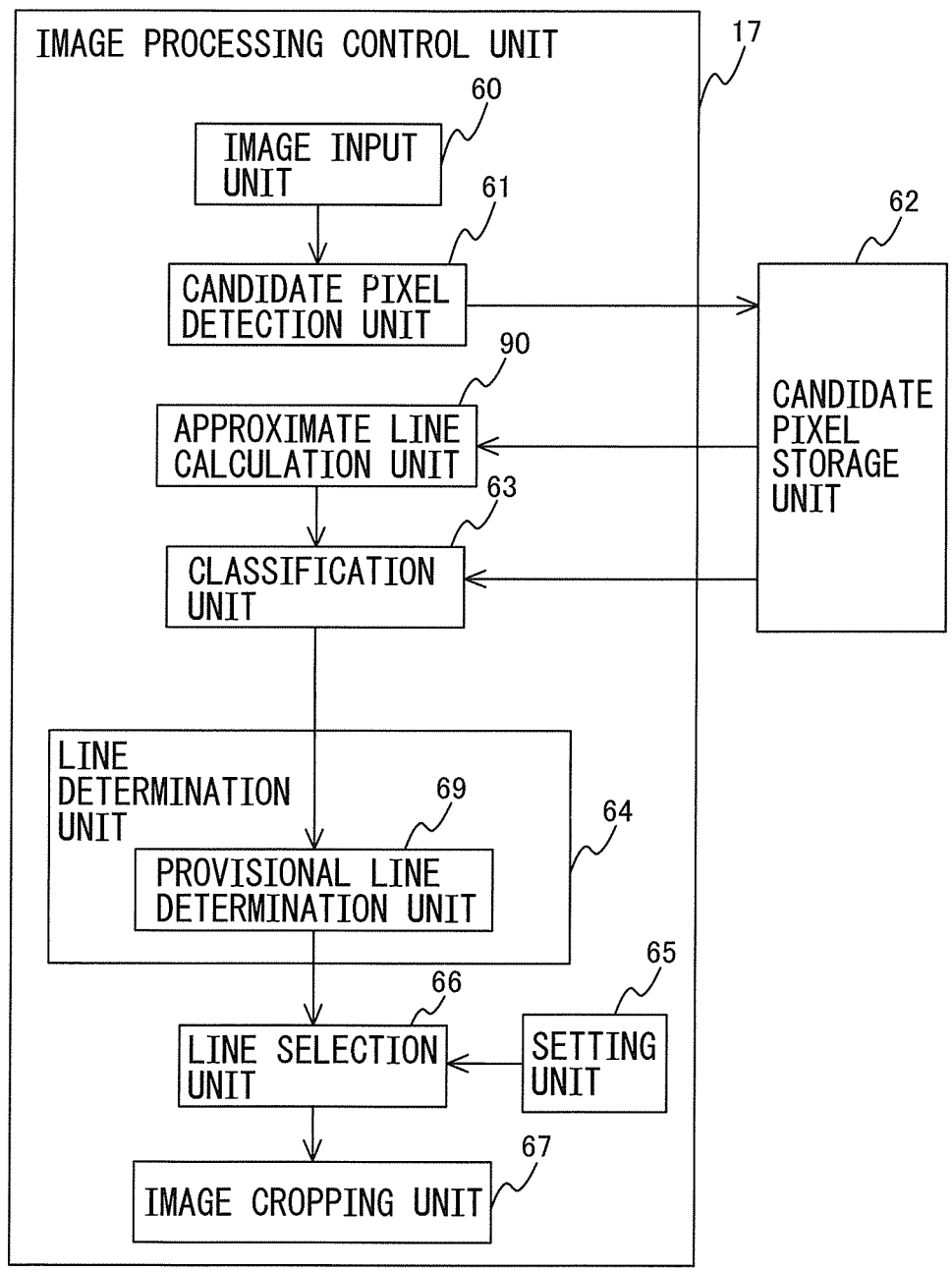
FIG. 22 is a diagram illustrating a second example of the exemplary construction of the image processing control unit.

FIG. 22 is a diagram illustrating a second example of the exemplary construction of the image processing control unit 17. Same components as the components of the image processing control unit 17 as depicted in FIG. 7 are denoted by same reference numerals. Operation of the components denoted by same reference numerals is same unless otherwise indicated.

The image processing control unit 17 includes an approximate line calculation unit 90. In other examples, in place of the image processing control unit 17, CPU 11 may execute the processing of the approximate line calculation unit 90. In other examples, CPU 31 of the computer 30 may execute the processing of the approximate line calculation unit 90.

The approximate line calculation unit 90 selects the candidate pixels which have been detected by the candidate pixel detection unit 61 and stored in the candidate pixel storage unit 62, and calculates a plurality of approximate lines for the boundary lines of respective sides of the document region. In order to calculate approximate lines from the coordinate of the candidate pixels, various methods such as the least square method, Hough transformation, etc., may be utilized.

The classification unit 63 determines the distance between the approximate lines and each candidate pixel stored in the candidate pixel storage unit 62. The classification unit 63 generates, for each approximate line, a coordinate group including the candidate pixels within a prescribed distance from the approximate line. The provisional line determination unit 69 determines the approximate line forming the coordinate group including the largest number of candidate pixels as the provisional line for the side. The provisional line determination unit 69 detects the slope of the provisional line as the inclination of the document.

The line determination unit 64 selects one or more from a plurality of approximate lines calculated by the approximate line calculation unit 90. For example, the line determination unit 64 compares the slope of the provisional line and the slope of the approximate lines, and selects one or more approximate lines for which difference of slope is within a prescribed range. The line selection unit 66 selects one line from among the approximate lines selected by the line selection unit 66 as the boundary line for cropping the document region.

Figure 23:
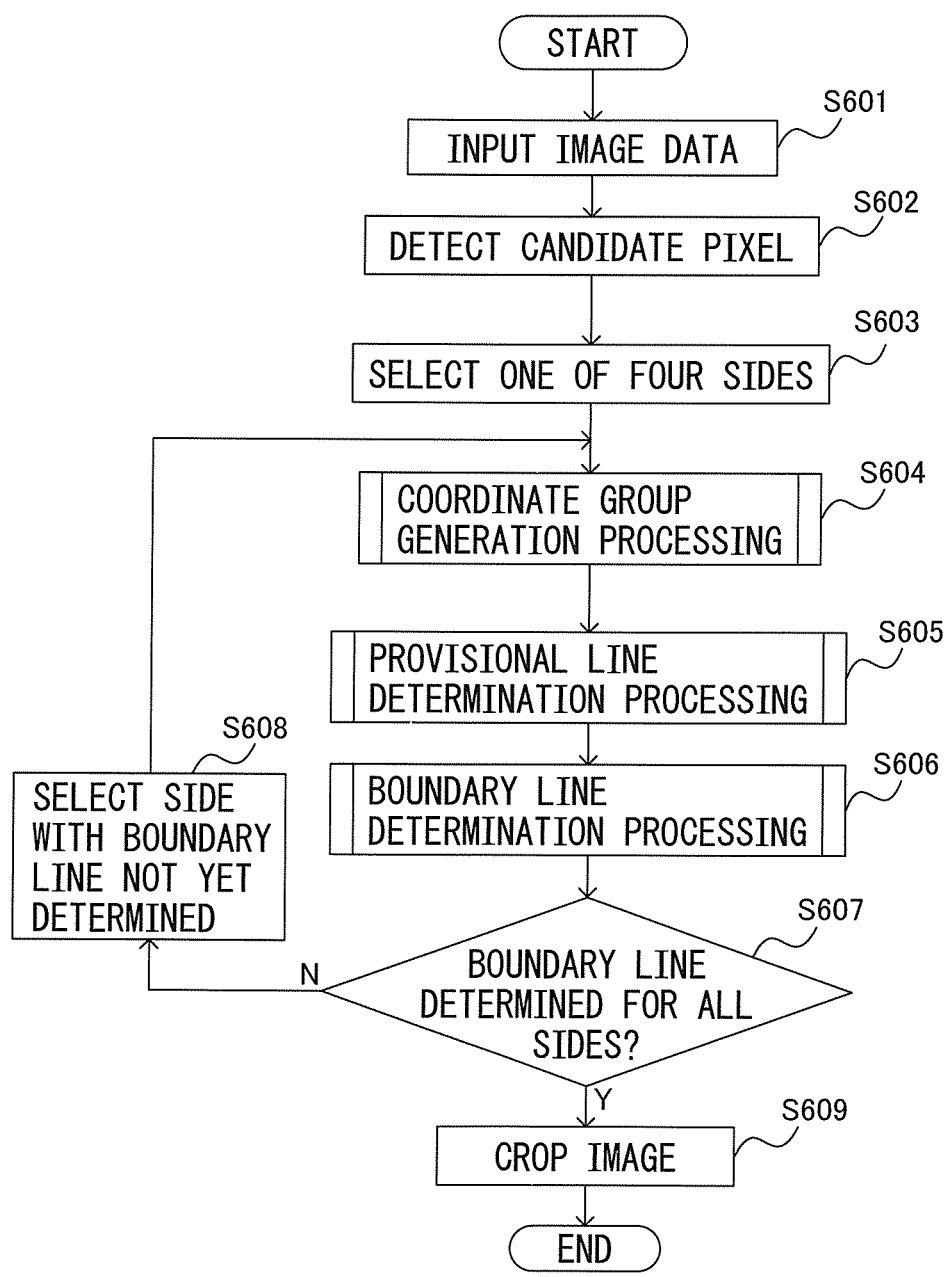
FIG. 23 is a diagram illustrating a second example of the processing performed by the image processing system.

FIG. 23 is a diagram illustrating a second example of the processing performed by the image processing system 1. The processing at steps S601 to S603 is the same as the processing at steps S101 to S103 illustrated with reference to FIG. 3. Following steps S604 to S606 are performed for each side of the document region.

Figure 24:
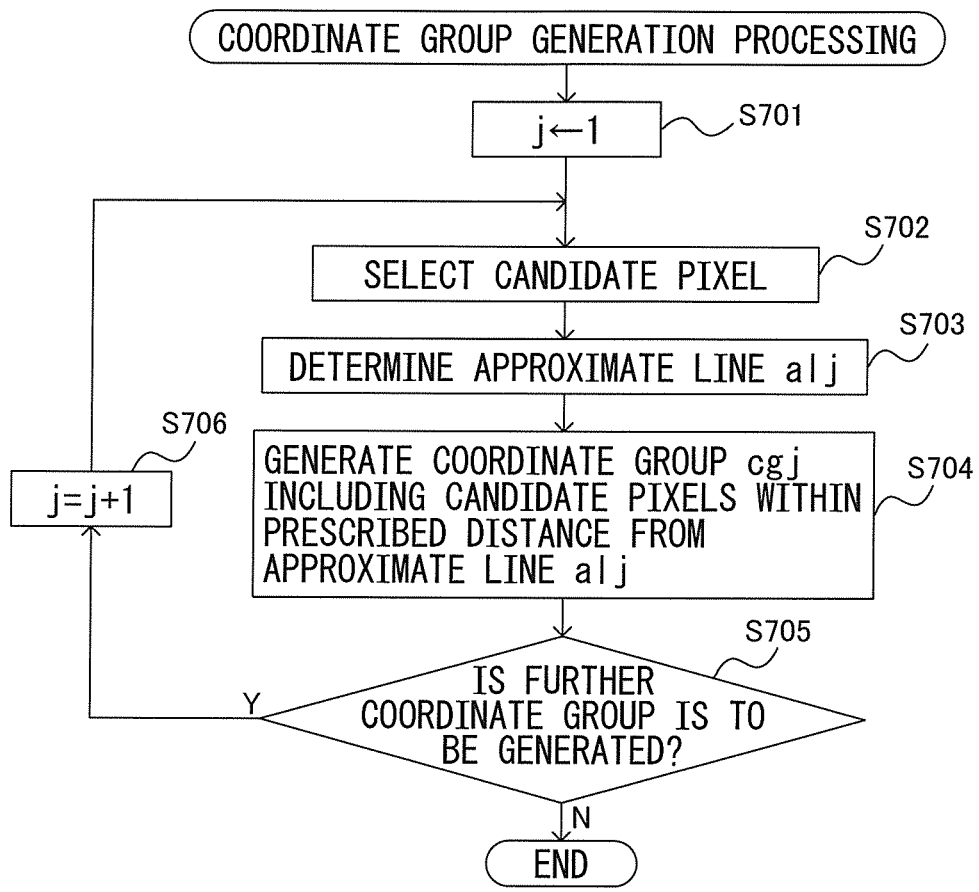
FIG. 24 is a diagram illustrating a second example of the coordinate group generation processing performed by the classification unit 63.

At step S604, the classification unit 63 generates a plurality of coordinate groups by classifying the candidate pixels into different groups. FIG. 24 is a diagram illustrating the second example of the coordinate group generation processing by the classification unit 63.

At step S701, "1" is substituted into the index "j" referring to the coordinate group. At step S702, the approximate line calculation unit 90 selects a plurality of candidate pixels stored in the candidate pixel storage unit 62. At step S703, the approximate line calculation unit 90 calculates an approximate line alj for the boundary line of a side of the document region based on the selected candidate pixels.

At step S704, the classification unit 63 generates a coordinate group cgj including the candidate pixels within a prescribed distance from the approximate line alj. At step S705, the approximate line calculation unit 90 determines whether or not further coordinate group is to be generated. For example, when there are candidate pixels not yet belonging to any coordinate group, the approximate line calculation unit 90 determines that further coordinate group is to be generated. When any one of all candidate pixels belongs to some coordinate group, it determines that no further coordinate group is necessary.

If further coordinate group is to be generated (step S705: Y), the processing proceeds to step S706. If no further coordinate group is to be generated (step S705: N), the processing is terminated. At step S706, the value of the index j is incremented. Thereafter, the processing returns to step S702.

Figure 25:
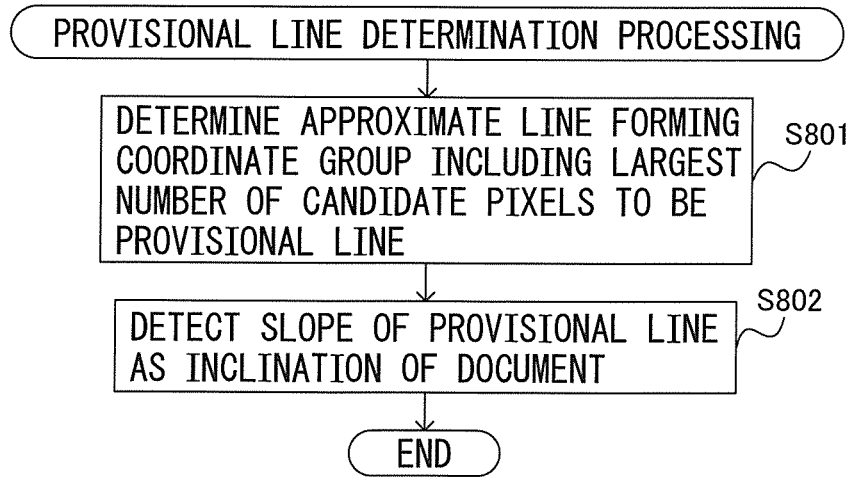
FIG. 25 is a diagram illustrating a second example of the provisional line determination processing performed by the line determination unit.

Referring to FIG. 23, at step S605, the line determination unit 64 selects any of the approximate lines alj calculated in the coordinate group generation processing as the provisional line. FIG. 25 is a diagram illustrating the second example of the provisional line determination processing performed by the line determination unit 64.

At step S801, the provisional line determination unit 69 of the line determination unit 64 determines the approximate line forming the coordinate group including the largest number of candidate pixels as the provisional line for the side. At step S802, the provisional line determination unit 69 detects the slope of the provisional line as the inclination of the document.

Referring to FIG. 23, at step S606, the line determination unit 64 and the line selection unit 66 determine the boundary line for cropping the document region from image data. The processing for determining the boundary line may be the same as the boundary line determination processing illustrated with reference to FIG. 19. The processing at steps S607 to S609 is the same as the processing at step S108 to S110 illustrated with reference to FIG. 3.

In accordance with the present example, a plurality of approximate lines for the boundary line on each side is calculated, and an approximate line including the largest number of candidate pixels within a prescribed distance from the approximate line is selected. Therefore, even if, among these candidate pixels, there is a candidate pixel detected at a distant position from the same line, an approximate line calculated from the candidate pixels is selected so as to have smaller error in the slope. As a result, the error in slope produced in the boundary line for cropping the image of the document region from image data is reduced, and each side of the document region can be detected in high precision.

In the present example, when the document region includes a tab, image of the document including tab portion or image of the document not including tab portion can also be arbitrarily selected and cropped from image data.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. An image processing apparatus comprising:
   an image input unit for taking image data, generated by capturing an image of a document having a rectangle region and a tab portion provided on a side of the rectangle region, as input;
   a line determination unit for detecting from coordinates of pixels in the image data and on a side of the image data having a tab portion in said image data, a line extending the boundary of the tab portion opposite to the boundary of the rectangle region, and a line extending the boundary of the rectangle region;
   a selector for selecting, in accordance with a setting that designates an outside or an inside of said document region, a line in the outside or in the inside of said document region from the lines detected by said line determination unit; and
   an image cropper for cropping an image of said document region with said selected line as a boundary line.

2. The image processing apparatus according to claim 1, further comprising:
   a candidate pixel detector for detecting coordinates of candidate pixels which are candidates of pixels constituting the boundary line of the side of said document region; and
   a classifier for classifying, for each side of said document region, the coordinates of said candidate pixels detected in a plurality of respective portions of the boundary line into a plurality of different coordinate groups;
   wherein said line determination unit comprises:
   an approximate line calculator for calculating a plurality of approximate lines for the boundary line based on the coordinates belonging to each of said plurality of coordinate groups to determine the lines extending the boundary of the document region in the tab portion and in the non-tab portion.

3. The image processing apparatus according to claim 2, further comprising an inclination detector for detecting the inclination of said document region;
   wherein said line determination unit comprises:
   a line selector for selecting approximate lines for which a difference of inclination from the inclination of said document region is within a prescribed range from said approximate lines calculated for each coordinate group as the lines extending the boundary of the document region in the tab portion and in the non-tab portion.

4. An image processing method performed by a computer and an image reading device, the method comprising:
   acquiring image data generated by capturing an image of a document having a rectangle region and a tab portion provided on a side of the rectangle region;
   detecting, using a computer, from coordinates of pixels in the image data and on a side of the image data having a tab portion in said image data, a line extending a boundary of the tab portion opposite to the boundary of the rectangle region and a line extending the boundary of the rectangle region;

selecting a line in an outside or in an inside of said document region from the determined lines, in accordance with a setting that designates the outside or the inside of said document region; and cropping an image of said document region with said selected line as the boundary line.

5. A computer-readable, non-transitory medium storing a computer program for image processing, wherein said computer program causes a computer to execute a process, said process comprising:

acquiring image data generated by capturing an image of a document having a rectangle region and a tab portion provided on a side of the rectangle region;

detecting from coordinates of pixels in the image data and on a side of the image data having a tab portion in said image data, a line extending a boundary of the tab portion opposite to the boundary of the rectangle region and a line extending the boundary of the rectangle region, respectively;

selecting a line in an outside or in an inside of said document region from the determined lines, in accordance with a setting that designates the outside or the inside; and cropping an image of said document region with said selected line as the boundary line.

6. An image processing system comprising an image reading device for taking image data generated by capturing an image of a document having a rectangle region and a tab portion provided on a side of the rectangle region, as input; and a computer that receives the image data generated by the image reading device via communication with the image reading device, wherein said image reading device comprises:

a line determination unit for detecting from coordinates of pixels in the image data and on a side of the image data having a tab portion in the image data generated by said image reading device, a line extending a boundary of the tab portion opposite to the boundary of the rectangle region and a line extending the boundary of the rectangle region, based on said image data;

a selector for selecting, in accordance with a setting that designates an outside or an inside of said document region, a line in the outside or in the inside of said document region, from the lines detected by said line determination unit; and an image cropper for cropping an image of said document region with said selected line as the boundary line.

* * * * *